(12) United States Patent
Maitre et al.

(10) Patent No.: US 12,722,537 B2
(45) Date of Patent: Sep. 1, 2026

(54) AUTOMATIC DRIVER SEAT ADJUSTMENT IN A VEHICLE BASED ON SEAT POSITION IMAGING

(71) Applicant: Volvo Truck Corporation, Gothenburg (SE)

(72) Inventors: Julien Maitre, Chuzelles (FR); Yann Quibriac, Lyons (FR)

(73) Assignee: Volvo Truck Corporation, Gothenburg (SE)

( * ) Notice: Subject to any disclaimer, the term of this patent is extended or adjusted under 35 U.S.C. 154(b) by 53 days.

(21) Appl. No.: 18/943,066

(22) Filed: Nov. 11, 2024

(65) Prior Publication Data

US 2025/0249797 A1 Aug. 7, 2025

(30) Foreign Application Priority Data

Feb. 2, 2024 (EP) .................................... 24155426

(51) Int. Cl.
*B60N 2/02* (2006.01)
*B60N 2/20* (2006.01)

(52) U.S. Cl.
CPC ......... *B60N 2/0278* (2023.08); *B60N 2/0226* (2023.08); *B60N 2/20* (2013.01)

(58) Field of Classification Search
CPC ...... B60N 2/0278; B60N 2/0226; B60N 2/20; B60N 2/0248; B60N 2210/24; B60N 2/0272
See application file for complete search history.

(56) References Cited

U.S. PATENT DOCUMENTS 5,822,707 A 10/1998 Breed et al.
6,775,606 B1 8/2004 Ertl et al.
(Continued)

FOREIGN PATENT DOCUMENTS

CN 110194174 A 9/2019
CN 210062729 U 2/2020
(Continued)

OTHER PUBLICATIONS

Hoffman, C. et al., "Here's How Mercedes-Benz's Automatic Driver's Seat Adjustment Work," Car and Driver News, Nov. 1, 2019, available online: [URL: https://www.caranddriver.com/news/a29643051/mercedes-benz-automatic-seat-adjustment-height-mbux/], 4 pages.
(Continued)

*Primary Examiner* — Donald J Wallace
*Assistant Examiner* — Jalal C Coduroglu
(74) *Attorney, Agent, or Firm* — Withrow & Terranova, PLLC

(57) ABSTRACT

Automatic driver seat adjustment in a vehicle based on seat position imaging is disclosed. A computer system in the vehicle receives target seat position data indicating a target seat position of a set in a vehicle. To adjust the seat to the target seat position, imaging media of the seat is captured with the camera. The imaging media includes images of the seat that are indicative of the current seat position of the seat. The media is processed to determine the current seat position relative to the target seat position. The seat position is then controlled with a seat actuator to move the seat to a new seat position that is toward the target seat position. By utilizing a camera, multiple sensors are not required to keep track of seat position and a camera already used for other purposes in the vehicle can be further utilized for automatic seat positioning.

20 Claims, 16 Drawing Sheets

(56) References Cited

U.S. PATENT DOCUMENTS

| | | | | |
|---|---|---|---|---|
| 7,136,734 | B2 | 11/2006 | Durach et al. | |
| 11,117,534 | B2 | 9/2021 | Coburn et al. | |
| 11,348,269 | B1 * | 5/2022 | Ebrahimi Afrouzi | G01S 17/48 |
| 11,801,776 | B2 * | 10/2023 | Kulhawik | B60K 35/26 |
| 2006/0140446 | A1 * | 6/2006 | Luo | G06T 7/593 382/104 |
| 2007/0086624 | A1 * | 4/2007 | Breed | B60R 21/01552 382/104 |
| 2016/0339802 | A1 * | 11/2016 | Hanlon | B60N 2/0027 |
| 2018/0014988 | A1 * | 1/2018 | Diaz-Flores | A61G 5/023 |
| 2018/0111511 | A1 * | 4/2018 | Lota | B60N 2/02246 |
| 2019/0359093 | A1 * | 11/2019 | Nishide | B60N 2/0228 |
| 2020/0171979 | A1 * | 6/2020 | Yetukuri | B60N 2/01 |
| 2021/0170980 | A1 | 6/2021 | An | |
| 2022/0126864 | A1 * | 4/2022 | Moustafa | B60W 60/0013 |
| 2022/0207744 | A1 * | 6/2022 | Tian | G06T 7/194 |
| 2024/0067052 | A1 * | 2/2024 | Legh | B60N 2/34 |
| 2024/0109460 | A1 * | 4/2024 | Rangel Sanchez | B60N 2/0268 |
| 2024/0130621 | A1 * | 4/2024 | Islam | A61B 5/0075 |

FOREIGN PATENT DOCUMENTS

| | | | |
|---|---|---|---|
| CN | 110944429 | A | 3/2020 |
| DE | 102012006118 | A1 | 9/2012 |
| EP | 1405755 | A1 | 4/2004 |

OTHER PUBLICATIONS

Extended European Search Report for European Patent Application No. 24155426.0, mailed Jul. 29, 2024, 8 pages.

* cited by examiner

AUTOMATIC DRIVER SEAT ADJUSTMENT IN A VEHICLE BASED ON SEAT POSITION IMAGING

PRIORITY APPLICATIONS

The present application claims priority to European Patent Application No. 24155426.0, filed on Feb. 2, 2024, and entitled "AUTOMATIC DRIVER SEAT ADJUSTMENT IN A VEHICLE BASED ON SEAT POSITION IMAGING," which is incorporated herein by reference in its entirety.

TECHNICAL FIELD

The disclosure relates generally to driver seat adjustment mechanisms in a vehicle. In particular aspects, the disclosure relates to automatically adjusting the driver's seat in a vehicle based on seat position imaging. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

Automatic seat adjustment provides enhanced comfort, safety, and convenience for drivers and passengers alike. Automatic seat adjustment involves recording the desired position of a seat as a target seat position, and then subsequently at a later point in time, adjusting the current position of the seat to move towards or go back to the target seat position. For example, many vehicles come with memory settings that are capable, when activated, of recording a desired, target seat position(s) thereby allowing drivers to save their preferred scat position.

Unfortunately, these automatic seat adjustment systems are often costly as requiring expensive equipment to perform this functionality. Among the more expensive pieces of equipment to perform automatic seat adjustment are the sensors (e.g., position sensors) to track seat position and determine when the seat position has adjusted back to a previously recorded, target seat position. Then, to adjust the seat to a desired position, each dimension of the orientation of the seat (e.g., the tilt of the seatback of the seat, the front/back position, vertical position of the seat) is adjusted through a seat actuator(s), which may require various position sensors so the different mechanisms in the seat actuator can sense when they have provided the correct seat adjustment. Additionally, weight sensors are often employed since the passenger's weight can affect the amount of adjustment needed by the different mechanisms in the seat actuator to position the seat appropriately. These multitude of sensors are expensive and often require complex solutions to appropriately position the seat.

SUMMARY

Automatic driver seat adjustment in a vehicle based on seat position imaging are disclosed. In exemplary aspects, a camera associated with the vehicle is utilized to capture images of a desired target position of a seat in the vehicle and to subsequently determine a current seat position differs from a recorded target seat position. The seat can subsequently be adjusted to be moved from a current seat position towards or to the desired target seat position based on the images related to the seat position captured by the camera. For example, the camera can be controlled by a computer system to capture a first image of a seat in response to a trigger, such as a user input to record a desired, target seat position of a seat. The camera can then also be controlled by the computer system to capture a second image of a current seat position of the seat in response to another trigger, such as user input or a user entering the vehicle as examples. The current seat position of the seat can then be controlled by the computer system by controlling a seat actuator to move the seat to a new seat position based on determined difference between the target seat position and the current seat position using the images captured by the camera. In some examples, the imaging media from the camera is used in a feedback loop where images are continually used to determine the current seat position and move the seat until the seat is in the target seat position. Some of the examples include automatic adjustments of different dimensions of the orientation of the seat including the tilt of the seatback of the seat, the front/back position of the seat, and the vertical position of the seat to target positions. By utilizing a camera to determine whether seat position, a multitude of sensors do not have to be utilized to determine seat position as part of the seat adjustment system and may be omitted from the vehicle. For example, the camera may be part of an existing driver monitoring system already present in the vehicle and that is configured to detect a real-time evaluation of the driver's face to determine their state of presence as a safety feature. In this manner, as a non-limiting example, an existing camera is used as part of the seat adjustment system to provide a way to record seat positions of the seat with reduced added cost.

In some examples, the target seat position data is an image taken by a camera in the vehicle of the seat in the target seat position. The image of the seat in the target seat position may be taken in response to user input (e.g., pushing a button in the vehicle or a smart device indicating that the seat is in the correct position). While adjusting the seat so that the seat is provided in the target seat position, the image of the seat in the target seat position is overlayed onto the image of the seat in the current seat position to determine a current displacement that indicates the current seat position relative to the target seat position indicated by the target seat position data. The seat is then adjusted to a new position to correct the current orientation displacement.

By utilizing a camera to determine whether the seat is in the desired position, a multitude of sensors do not have to be utilized to determine whether the seat is in the appropriate seat position and may be omitted from the vehicle. By receiving imaging media having an image of the seat taken with the camera, the imaging media can be processed to determine a current seat position relative to a target seat position. Based on the received imaging media depicting the seat, the seat in the vehicle is moved toward the target seat position. The image of the seat depicts the current seat position among the different dimensions of orientation for the seat position and thus different position sensors are not required in order to keep track of the seat position. Furthermore, weight sensors do not have to be utilized to keep track of the seat position since the imaging media inherently depicts the correct seat position regardless of the weight being supported by the seat.

According to a first aspect of the disclosure, a computer system comprising processing circuitry configured to: (a) receive a target seat position data indicating a target seat position of a seat in a vehicle; (b) receive imaging media comprising an image of the seat from a camera indicative of a current seat position of the seat; (c) process the imaging media to determine the current seat position relative to the target seat position indicated by the target seat position data; and (d) control a seat position actuator to move the seat to a new seat position towards the target seat position, in response to the current seat position differing from the target seat position by more than a threshold orientation displacement. A technical benefit may include utilizing a camera to keep track of the current seat position thereby reducing the number of sensors used to provide the seat in the target seat position.

Optionally in some examples, including in at least one preferred example, the target seat position data comprises a second image of the seat in the target seat position. A technical benefit may include utilizing an image to record the target seat position.

Optionally in some examples, including in at least one preferred example, the processing circuitry is further configured to: (e) receive second imaging media of the seat from the camera; (f) receive user input indicative that the seat is in the target seat position; (g) capture the second image in the second imaging media of the seat in the target seat position in response to receiving the user input; and (h) store the captured second image as the target seat position data in a non-transitory computer readable medium, wherein the processing circuitry is configured to (a) receive the captured second image from the non-transitory computer readable medium as the target seat position data indicating the target seat position of the seat in the vehicle. A technical benefit may include utilizing the camera so that a user can position the seat in the target seat position and record the target seat position using an image.

Optionally in some examples, including in at least one preferred example, the processing circuitry is configured to: process the imaging media by being configured to: overlaying the image of the seat from the imaging media of the current seat position of the seat with the captured second image to determine a current orientation displacement that indicates the current seat position relative to the target seat position indicated by the target seat position data; determine whether the current orientation displacement is more than the threshold orientation displacement; and (d) control the seat position actuator to move the seat to the new seat position towards the target seat position, in response to current orientation displacement being greater than the threshold orientation displacement. A technical benefit may include using overlaying techniques with images to move the seat toward a target seat position.

Optionally in some examples, including in at least one preferred example, the processing circuitry is configured to: (a) receive the target seat position data indicating a target feature position of a seat feature of the seat, wherein the target feature position indicates the target seat position of the seat in the vehicle; (c) process the imaging media by being configured to: extract a representation of the seat feature in the imaging media; and determine a current feature position data indicating a current feature position of the seat feature based on the extracted representation of the seat feature; and (d) control the seat position actuator to move the seat to the new seat position towards the target seat position, in response to the current feature position differing from the target feature position by more than the threshold orientation displacement. A technical benefit may include using the images to determine the current seat position and the target seat position to move the seat to the new seat position.

Optionally in some examples, including in at least one preferred example, the seat feature is a seat portion that is part of the seat and wherein the processing circuitry is configured to: (a) receive the target seat position data indicating a target seat portion position of the seat, wherein the target seat portion position indicates the target seat position of the seat in the vehicle; (c) process the imaging media by being configured to: extract a representation of the seat portion in the imaging media; and determine a current seat portion position data indicating a current seat portion position of the seat feature based on the extracted representation of the seat portion; and (d) control the seat position actuator to move the seat to the new seat position towards the target seat position, in response to the current seat portion position differing from the target seat portion position by more than the threshold orientation displacement. A technical benefit may include using a particular portion of the seat to track how to move the seat towards the target seat position.

Optionally in some examples, including in at least one preferred example, the seat portion is a headrest of the seat. A technical benefit may include using the headrest of the seat to track how to move the seat towards the target seat position.

Optionally in some examples, including in at least one preferred example, wherein: the seat feature comprises a marker connected to the seat; and the processing circuitry is configured to: (a) receive the target seat position data indicating a target marker position of the marker connected to the seat, wherein the target marker position indicates the target seat position of the seat in the vehicle; (c) process the imaging media by being configured to: extract a representation of the marker in the imaging media; and determine a current marker position data indicating a current marker position of the seat feature based on the extracted representation of the marker; and (d) control the seat position actuator to move the seat to the new seat position towards the target seat position, in response to the current marker position differing from the target marker position by more than the threshold orientation displacement. A technical benefit may include using a marker to keep track of the seat position to move the seat toward the target seat position.

Optionally in some examples, including in at least one preferred example, the processing circuitry is configured to: (a) receive the target seat position data indicating a target tilt position of a seatback of the seat; (c) process the imaging media by being configured to determine a current tilt position data indicating a current tilt position of the seat feature based on the image of the imaging media; and (d) control the seat position actuator to move the seatback of the seat to the new tilt position, in response to the current tilt position differing from the target tilt position by more than a threshold tilt displacement. A technical benefit may include adjusting the tilt of the seat toward a target tilt position.

Optionally in some examples, including in at least one preferred example, the processing circuitry is configured to: (a) receive the target seat position data indicating a front/back position of the seat; (c) process the imaging media by being configured to determine a current front/back position data indicating a current front/back position of the seat feature based on the image of the imaging media; and (d) control the seat position actuator to move the seat to the new front/back position, in response to the current front/back position differing from the target front/back position by more than a threshold front/back position displacement. A technical benefit may include adjusting the tilt of the seat toward a front/back position.

Optionally in some examples, including in at least one preferred example, the processing circuitry is configured to: (a) receive the target seat position data indicating a vertical position of the seat; (c) process the imaging media by being configured to determine a current vertical position data indicating a current vertical position of the seat feature based on the image of the imaging media; and (d) control the seat position actuator to move the seat to the new tilt position, in response to the current vertical position differing from the target vertical position by more than a threshold vertical position displacement. A technical benefit may include adjusting the tilt of the seat toward a vertical position.

Optionally in some examples, including in at least one preferred example, the processing circuitry is configured to: (d) control the seat position actuator to move the seat to the new seat position in response to the current seat position differing from the target seat position by more than a threshold orientation displacement such that in the new seat position the new position is within the threshold orientation displacement of the target seat position. A technical benefit may be using a threshold orientation displacement.

Optionally in some examples, including in at least one preferred example, the processing circuitry is configured to iteratively perform steps (b)-(d) until the current seat position does not differ from the target seat position by more than the threshold orientation displacement. A technical benefit may be using the camera in a feedback loop to iteratively move the seat toward the target seat position.

Optionally in some examples, including in at least one preferred example, the processing circuitry is configured to: (a) receive the target seat position data identifying a target front/back position of the seat, and a target vertical position of the seat; wherein in a first iteration of steps (b)-(d), the processing circuitry is configured to: (b) receive imaging media comprising a second image of the seat from a camera indicative of a current front/back position of the seat; (c) process the imaging media by being configured to determine a current front/back position data indicating the current front/back position of the seat based on the second image of the imaging media; and (d) control the seat position actuator to move the seat to the new front/back position, in response to the current front/back position differing from the target front/back position by more than a threshold front/back position displacement such that the new front/back position of the seat is within the threshold front/back position displacement; and wherein in a second iteration of steps (b)-(d), the processing circuitry is configured to: (b) receive imaging media comprising a third image of the seat from a camera indicative of a current vertical position of the seat; (c) process the imaging media by being configured to determine a current vertical position data indicating the current vertical position of the seat based on the image of the imaging media; and (d) control the seat position actuator to move the seat to the new vertical position, in response to the current vertical position differing from the target vertical position by more than a threshold vertical position displacement such that the new vertical position of the seat is within the threshold vertical position displacement. A technical benefit is using the camera in a feedback loop to iteratively move the seat toward the target front/back position.

Optionally in some examples, including in at least one preferred example, the processing circuitry is configured to perform the second iteration in response to performing the first iteration. A technical benefit is moving the seat toward the target vertical position before moving the seat toward target front/back position.

Optionally in some examples, including in at least one preferred example, the processing circuitry is configured to perform the second iteration in response to performing the first iteration. A technical benefit is moving the seat toward the target front/back position before moving the seat toward target vertical position.

Optionally in some examples, including in at least one preferred example, the processing circuitry is further configured to: (a) receive the target seat position data further indicating a target tilt of a seat back of the seat, a target front/back position of the seat, and a target vertical position of the seat; and in a third iteration of steps (b)-(d), the processing circuitry is further configured to: (b) receive imaging media comprising a first image of the seat from the camera indicative of a current tilt position of the seat; (c) process the imaging media by being configured to determine a current tilt position data indicating the current tilt position of the seat based on the first image of the imaging media; and (d) control the seat position actuator to move the seatback of the seat to the new tilt position, in response to the current tilt position differing from the target tilt position by more than a threshold tilt displacement such that the new tilt position of the seatback is within the threshold tilt displacement. A technical benefit is moving the seat toward the target tilt position.

Optionally in some examples, including in at least one preferred example, the processing circuitry is configured to perform the first iteration in response to performing the third iteration and is configured to perform the second iteration in response to performing the first iteration. A technical benefit is moving the seat toward the target tilt position before moving the seat toward the target front/back position and the target vertical position.

Optionally in some examples, including in at least one preferred example, the seat in the vehicle is a driver's seat; the vehicle comprises a driver monitoring system (DMS) comprising the camera; the imaging media includes a stream of images of a driver sitting in the seat of the vehicle; the processing circuitry is further configured to: detecting one or more facial representations in the stream of images of a face of the driver; determining a drive presence of the driver based on the one or more facial representations. A technical benefit is reusing the camera for different purposes.

According to a second aspect of the disclosure, a vehicle comprising the computer system of any of the examples above. A technical benefit may include utilizing a camera to keep track of the current seat position thereby reducing the number of sensors used to provide the seat in the target seat position.

Optionally in some examples, including in at least one preferred example, the vehicle comprises a dashboard and the camera is attached to or integrated into the dashboard. A technical benefit is integrated to or attached to the dashboard.

According to a third aspect of the disclosure, a computer-implemented method, comprises: (a) receiving, by processing circuity, a target seat position data indicating a target seat position of a seat in a vehicle; (b) receiving, by the processing circuity, imaging media comprising an image of the seat from a camera indicative of a current seat position of the seat; (c) processing, by the processing circuity, the imaging media to determine the current seat position relative to the target seat position indicated by the target seat position data; and (d) controlling, by the processing circuitry, a seat position actuator to move the seat to a new seat position towards the target seat position, in response to the current seat position differing from the target seat position by more than a threshold orientation displacement. A technical benefit may include utilizing a camera to keep track of the current seat position thereby reducing the number of sensors used to provide the seat in the target seat position.

According to a third aspect of the disclosure, a non-transitory computer-readable storage medium comprising instructions, which when executed by the processing circuitry, cause the processing circuitry to perform the method in the third aspect above.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

There are also disclosed herein computer systems, control units, code modules, computer-implemented methods, computer readable media, and computer program products associated with the above discussed technical benefits.

BRIEF DESCRIPTION OF THE DRAWINGS

Examples are described in more detail below with reference to the appended drawings.

DETAILED DESCRIPTION

Figure 1A:
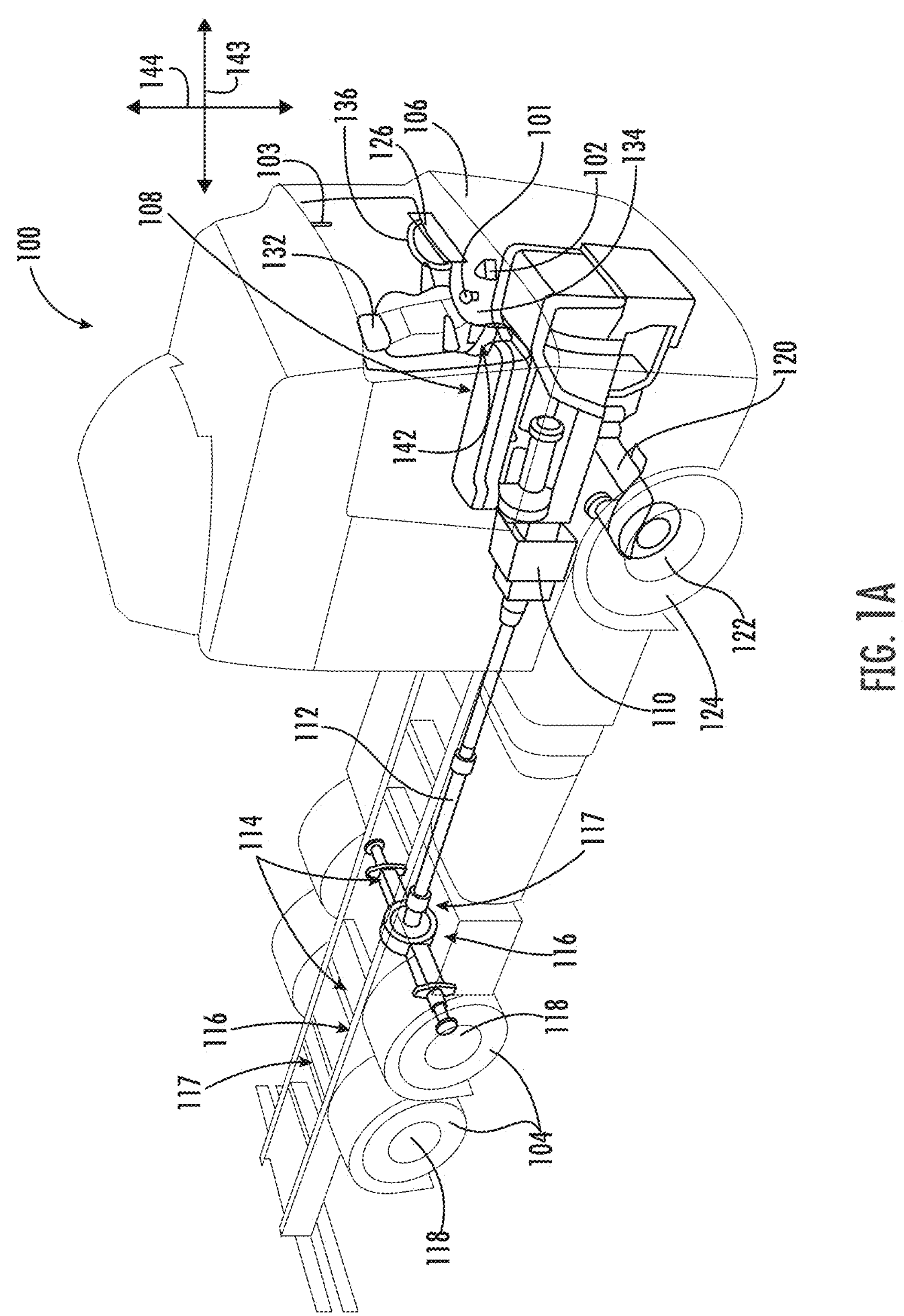
FIG. 1A is an exemplary vehicle that includes a camera and a control system configured to automatically adjust a seat in the vehicle to a target seat position.

The detailed description set forth below provides information and examples of the disclosed technology with sufficient detail to enable those skilled in the art to practice the disclosure.

Automatic driver seat adjustment in a vehicle based on seat position imaging is disclosed. In exemplary aspects, a camera associated with the vehicle is utilized to capture images of a desired target position of a seat in the vehicle and to subsequently determine a current seat position differs from a recorded target seat position. The seat can subsequently be adjusted to be moved from a current seat position towards or to the desired target seat position based on the images related to the seat position captured by the camera. For example, the camera can be controlled by a computer system to capture a first image of a seat in response to a trigger, such as a user input to record a desired, target seat position of a seat. The camera can then also be controlled by the computer system to capture a second image of a current seat position of the seat in response to another trigger, such as user input or a user entering the vehicle as examples. The current seat position of the seat can then be controlled by the computer system by controlling a seat actuator to move the seat to a new seat position based on determined difference between the target seat position and the current seat position using the images captured by the camera. In some examples, the imaging media from the camera is used in a feedback loop where images are continually used to determine the current seat position and move the seat until the seat is in the target seat position. Some of the examples include automatic adjustments of different dimensions of the orientation of the seat including the tilt of the seatback of the seat, the front/back position of the seat, and the vertical position of the seat to target positions. By utilizing a camera to determine whether seat position, a multitude of sensors do not have to be utilized to determine seat position as part of the seat adjustment system and may be omitted from the vehicle. For example, the camera may be part of an existing driver monitoring system already present in the vehicle and that is configured to detect a real-time evaluation of the driver's face to determine their state of presence as a safety feature. In this manner, as a non-limiting example, an existing camera is used as part of the seat adjustment system to provide a way to record seat positions of the seat with reduced added cost.

In some examples, the target seat position data is an image taken by a camera in the vehicle of the seat in the target seat position. The image of the seat in the target seat position may be taken in response to user input (e.g., pushing a button in the car or a smart device indicating that the seat is in the correct position). While adjusting the seat so that the seat is provided in the target seat position, the image of the seat in the target seat position is overlayed onto the image of the seat in the current seat position to determine a current displacement that indicates the current seat position relative to the target seat position indicated by the target seat position data. The scat is then adjusted to a new position to correct the current orientation displacement.

By utilizing a camera to determine whether the seat is in the desired position, a multitude of sensors do not have to be utilized to determine whether the seat is in the appropriate scat position and may be omitted from the vehicle. By receiving imaging media having an image of the seat taken with the camera, the imaging media can be processed to determine a current scat position relative to a target seat position. Based on the received imaging media depicting the seat, the seat in the vehicle is moved toward the target seat position. The image of the seat depicts the current seat position among the different dimensions of orientation for the seat position and thus different position sensors are not required to keep track of the seat position. Furthermore, weight sensors do not have to be utilized to keep track of the seat position since the imaging media inherently depicts the correct seat position regardless of the weight being supported by the seat.

In this regard, FIG. 1A is an exemplary vehicle 100 that includes a camera 101 and a control system 102 configured to automatically adjust a seat in the vehicle 100 to a target scat position. Before discussing exemplary aspects of the control system 102 automatically adjusting a seat in the vehicle 100 to a target seat position starting at FIG. 1E, exemplary aspects of the vehicle 100 and its control system 102 are first described with regard to FIGS. 1A-1C below.

In this regard, with reference to FIG. 1A, the vehicle 100 that includes a cab 103 that houses an engine 104. The engine 104 is coupled to a gearbox 106 to couple the engine 104 to a drive shaft 108 to turn the drive shaft 108. In turn, the drive shaft 108 is coupled to a rear differential 110 that is coupled to a rear axle 112. The rotation of the drive shaft 108 will cause the power of the engine 104 to be transferred to the rear axle 112 through the rear differential 110 to rotate wheels 114 coupled to the rear axle 112, and thus rotate the rear tires 116 mounted on the wheels 114. In this example, the vehicle 100 is a truck that includes two rear axles 112 that are coupled to respective wheels 114. In this example, the vehicle 100 is also equipped to be operated in four-wheel drive (4WD), wherein the drive shaft 108 will be coupled to a front axle 118 that is coupled to front wheels 120, to drive power to the front wheels 120 causing the front wheels 120 and their mounted tires 122 to rotate. The vehicle 100 may also include rear axles pumps 123 that each include, for example, a hydraulic pump, to control a lifting force applied to the respective rear axles 112 to alter the load distribution on the rear axles 112 of the vehicle 100.

Figure 1B:
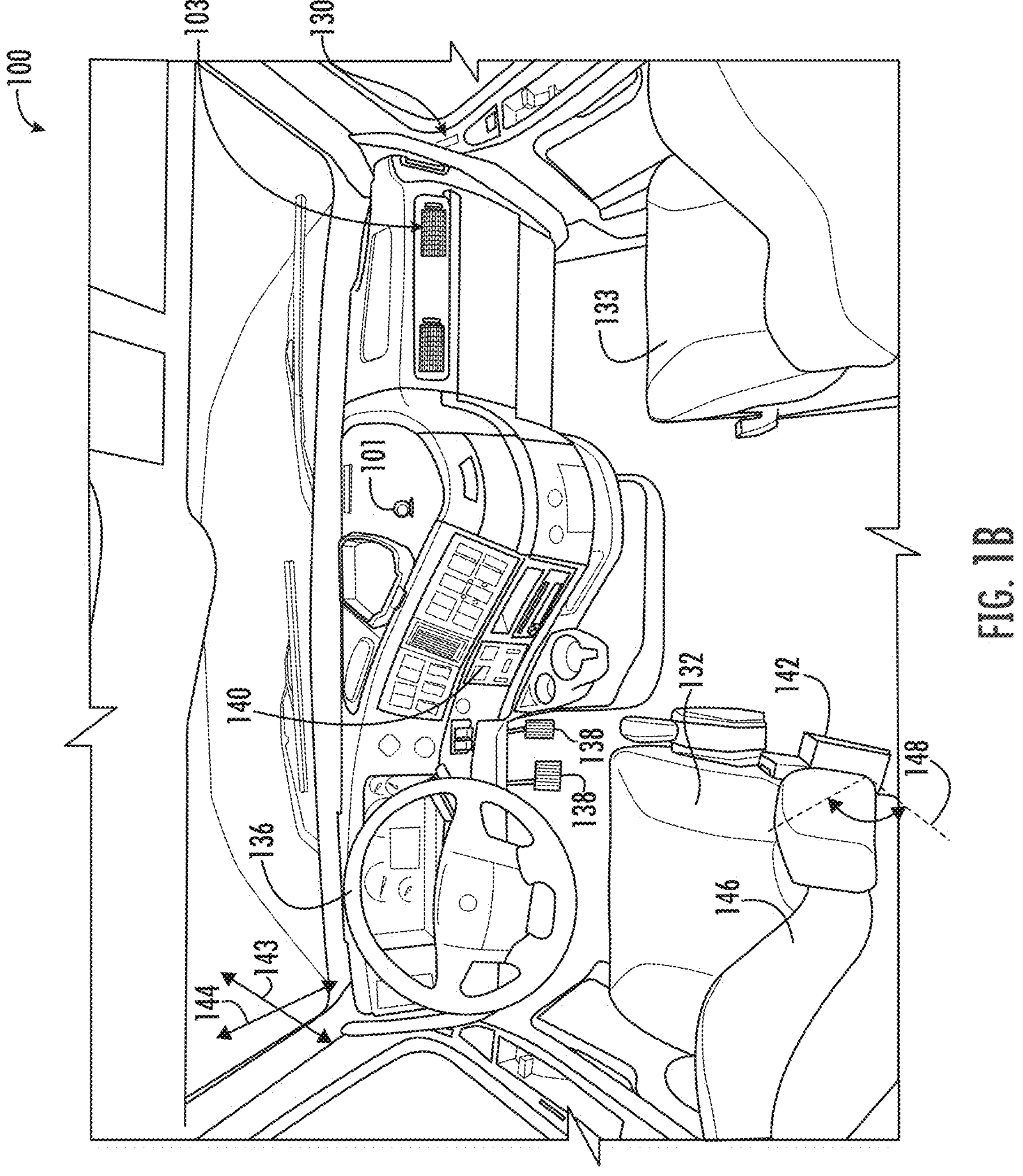
FIG. 1B is an exemplary driver's side compartment of the vehicle shown in FIG. 1A that includes the camera mounted to a dashboard of the driver side compartment.

FIG. 1B is an exemplary driver's side compartment of the vehicle shown in FIG. 1A that includes the camera 101 mounted to a dashboard 134 of the driver side compartment. Referring to FIG. 1B and with continuing reference to FIG. 1A, the vehicle 100 also has the control system 102, which in this example is a computer system that includes a processor or control circuit configured to execute computer program instructions to perform tasks. The control system 102 may be a microprocessor, a microcontroller, a Field Programmable Gate Array (FPGA), and/or the like. For example, the control system 102 may be an electronic control unit (ECU) or part of an ECU for the vehicle 100. The control system 102 is configured to control certain operations of the vehicle 100, such as the engine 104, the gearbox 106, and the rear axles 112 and front axle 118, among other components. A cabin 130 of the vehicle 100 is the interior of the vehicle 100 and the area within the vehicle 100 where passengers sit and where various controls and features are located, such as vehicle seats 132, a dashboard 134, a steering wheel 136, pedals 138, and entertainment systems 140 are located. In this embodiment, the cabin 130 includes the seat 132 on the driver's side of the vehicle 100. This is where the driver (i.e., the person operating the vehicle 100) sits while operating the vehicle 100. A passenger's side (side of the vehicle 100 where a person that is not operating the vehicle 100 and is next to the driver) of the vehicle 100 also includes a seat 133 in some examples. In other embodiments, the cabin 130 does not include a passenger's seat 133. In other embodiments, the cabin 130 further includes back seat (not shown) behind the seat 132 on the driver's side and/or a back seat (not shown) behind the seat 133 on the passenger's side. The steering wheel 136 sits about torso level and in front of the driver and allows the driver to control the movement of the vehicle 100. The pedals 138 sit around foot level to the driver and may include an accelerator pedal, a brake pedal, and/or a clutch pedal.

The vehicle 100 includes a seat actuator 142 that is configured to move the driver's side seat 132. The control system 102 is configured to control the seat actuator 142 to move the seat 132. The seat actuator 142 may include several mechanisms to move the seat 132 to different seat positions. A front/back axis 143 is defined to point from the front of the vehicle 100 to the back of the vehicle 100. A vertical axis 144 is defined to point from the bottom of the vehicle 100 to the top of the vehicle 100. The seat 132 further includes a seatback 146, which is the portion of the seat 132 that supports the driver's back while the driver is seated in the seat 132. The seatback 146 can be moved to along an angular range 148 to a specified angle.

The seat actuator 142 includes motors, gear mechanisms, linkage and rails, a transmission shaft, and/or other components that allow the seat actuator 142 to adjust the seat 132 to a front/back position of the seat 132 parallel to the front/back axis 143, adjust a vertical position of the seat 132 parallel to the vertical axis 144, and an angle of the seatback 146 along the angular range 148. The front/back position of the seat 132 is one of the dimensions of the seat position of the seat 132 within the vehicle 100. The vertical position of the seat 132 is another one of the dimensions of the seat position of the seat 132 within the vehicle 100. The angle of the seatback 146 is yet another dimension of the seat position of the seat 132 within the vehicle 100. Other embodiments of the seat position may have more or fewer dimensions depending on the different types of movements of the seat allowed by the seat actuator 142.

In order for the driver to operate the vehicle 100 comfortably and safely, the driver's arms need to be positioned at the right vertical and front/back distance and vertical distance from the steering wheel 136 while the driver's feet need to safely reach the pedals 138. Furthermore, it is desirable for the seatback 146 to be adjusted to the appropriate angle so that the driver's torso is positioned appropriately to reach the steering wheel 136. The appropriate seat position of the seat 132 will vary depending on the physiological characteristics of the driver and the dimensions of the cabin 130 of the vehicle 100.

The camera 101 can be controlled by the computer system 102 to capture a first image of the seat 132 in response to a trigger, such as a user input to record a target seat position of the seat 132. The camera 132 can then also be controlled by the computer system 102 to capture a second image of a current seat position of the seat 132 in response to another trigger, such as user input or a user entering the vehicle as examples. The current seat position of the seat can then be controlled by the computer system 102 by controlling the seat actuator 142 to move the seat to a new seat position based on determined difference between the target seat position and the current seat position using the images captured by the camera 101. In some examples, imaging media from the camera 101 is used in a feedback loop where images are continually used to determine the current seat position and move the seat 132 until the seat 132 is in the target seat position. Some of the examples include automatic adjustments of different dimensions of the orientation of the seat.

In this regard, the control system 102 is configured to operate the seat actuator 142 to adjust the seat 132 to the appropriate seat position by leveraging seat position imaging captured by the camera 101 to move the seat 132 to a target seat position for the driver. The seat position imaging of the seat 132 inherently depicts all of the various dimensions of the seat position of the seat 132. Thus, utilizing the seat position imaging captured by the camera 101 to adjust the seat 132 eliminates the necessity and even inclusion of various position sensors that keep track of the seat position since a different position sensor is not needed to keep track of each dimension (front/back, vertical, tilt angle) of the seat position. Furthermore, the seat imaging taken by the camera 101 inherently depicts the change in the seat position resulting from the driver's weight while sitting in the seat 132. Therefore, a weight sensor is not needed to calculate the effect of the driver's weight on the seat position.

Using the camera 101 in a feedback correction loop to move the seat 132 to the target seat position thus eliminates the need for many of the sensors that are currently used in the art to accurately perform seat adjustments. Furthermore, the camera 101 may also be used for multiple purposes, not just to adjust the seat position of the seat 132. For example, in some aspects, the camera 101 may be part of a drowsiness monitoring system (DMS) where the control system detects if the driver is showing outward signs of fatigue, sleepiness, or other mental states that would impair their ability to operate the vehicle 100.

Note that there may be various drivers of the vehicle 100, each associated with their own recorded seat position. In some exemplary aspects, the control system 102 is configured to detect which driver is sitting in the seat 132 and adjust the seat 132 to the recorded seat position that is associated with that particular driver. This may be done through the recognition of certain key frequency operated remotes (fobs) or through facial recognition performed by the camera in response to recognizing a driver in the seat 132. Note that while the discussion herein is focused on the driver's seat 132, the same aspects disclosed herein for the driver's seat may be utilized to move any seat (e.g., passenger seat 133) within the vehicle 100 to a recorded seat position associated with the passenger.

In the example shown in FIG. 1A and FIG. 1B the camera 101 is mounted on the dashboard 134 of the cabin 130. This configuration of the camera 101 allows for the camera 101 to capture imaging data of the seat 132, which allows the control system 102 to appropriately position the seat to a recorded seat position. However, any suitable configuration of the camera 101 where the camera 101 obtains suitable images that allows the control system 102 to adjust the scat 132 to the appropriate recorded seat position may be used. For example, in other embodiments, the camera 101 is integrated into the dashboard 134. In still other embodiments, the camera 101 is mounted to the seat 132 itself. In still other embodiments, the camera 101 is mounted in the ceiling of the vehicle 100. In still other embodiments, the camera 101 is mounted to the vehicle 100 outside of the cabin 130. In still other embodiments, the camera 101 is not mounted to the vehicle 100 but is mounted so as to have the appropriate view of the seat 132. These and other implementations would be apparent to one of ordinary skill in the art in light of this disclosure. Furthermore, note that while the discussion herein focuses on the positioning of the driver's seat 132 using the camera 101, the systems and techniques disclosed herein may be utilized to adjust any seat (e.g., passenger's seat 133) to a recorded scat position using a camera (e.g., camera 101).

Figure 1C:
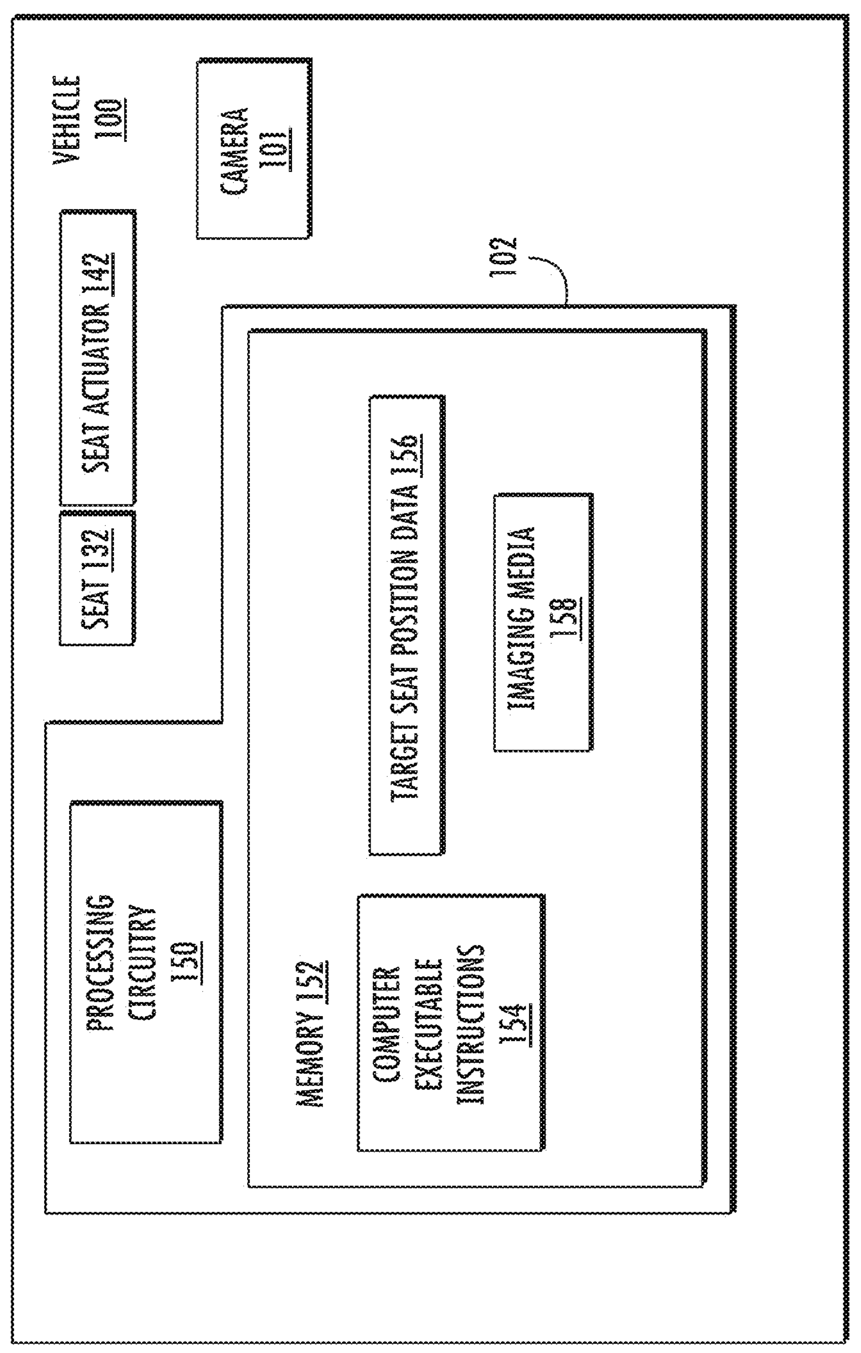
FIG. 1C is a block diagram view of FIG. 1A and FIG. 1B, according to one example.

FIG. 1C is a block diagram view of the vehicle 100 shown in FIG. 1A and FIG. 1B, in accordance with some aspects. In some embodiments, the control system 102 is a computer system. The vehicle 100 includes control system 102 is equipped with processing circuitry 150 (discussed below) and memory 152 that stores computer executable instructions 154. In response to executing the computer executable instructions 154 (e.g., software, firmware), the processing circuitry 150 is configured to perform several tasks. The processing circuitry 150 could also be provided as a microcontroller or other hardware processing circuitry, such as a field-programmable gate array (FPGA).

The processing circuitry 150 is configured to receive target seat position data 156 indicating a target seat position of the seat 132 in the vehicle 100. Examples of the processing circuitry 150 include a microcontroller, a control circuit, a logic circuit, a Field Programmable Gate Array (FPGA), and/or the like. In some examples, the target seat position data 156 is an image of the seat 132, which has been recorded in the target seat position. In other examples, the target seat position data 156 is a position identification numerically describing the different dimensions of the seat position in a coordinate system. The target seat position data 156 describes the various dimensions of the target seat position. In some aspects, the target scat position data 156 identifies a target front/back position of the seat 132. In some aspects, the target scat position data 156 identifies a target vertical position of the seat 132. In some aspects, the target seat position data 156 identifies a target tilt of the seatback 146 (Sec FIB. 1B) of the seat 132.

The processing circuitry 150 is configured to receive imaging media 158. In some examples, the imaging media 158 is a video stream of images captured by the camera 101. At least some of the images in the imaging media 158 are images of the seat 132 in the current seat position. The images in the imaging media 158 provides visual representations of the seat 132 as the seat 132 is currently positioned in the vehicle 100. The images inherently include depictions of the various dimensions of the seat position of the seat 132. In some aspects, the images depict the current front/back position of the seat 132. In some aspects, the images depict a current vertical position of the seat 132. In some aspects, the images depict a current tilt of the seatback 146 of the scat 132.

The processing circuitry 150 is configured to determine the current seat position relative to the target seat position indicated by the target scat position data 156. Any suitable image processing technique capable of extracting orientation information between different objects represented in a picture may be utilized. In some examples, an image of the seat 132 is overlayed over the image of the seat 132 in the target seat position. A difference in the different dimensions of the seat orientation between the target seat position and the current seat position is calculated from the overlay of the images. Adjustments to the different dimensions of the current seat position can be determined to move the seat 132 closer to the target seat position. In other embodiments, objects are detected and localized in the images and adjustment to the current seat position are calculated from the visual representation of the seat relative to the objects visually represented in the image. Other imaging techniques may be implemented to determine adjustments to move the seat 132 toward the target scat position.

The processing circuitry 150 is configured to control the seat actuator 142 to move the scat to a new seat position towards the target seat position, in response to the current seat position differing from the target seat position by more than a threshold orientation displacement. As discussed in more detail below, the processing circuitry 150 is configured to use data to identify the current seat position and the target seat position. In some aspects, the current scat position and the target seat position are identified in images of imaging media. For example, overlaying techniques are employed where an image of the seat at the current seat position is overlayed over an image of the seat in the target seat position. This overlaying allows the processing circuitry 150 to calculate how the seat 132 should be moved by the seat actuator 142 in order to move the seat from the current seat position to the target seat position. In other aspects, the current seat position and the target seat position are represented with location data that represents the location of the current seat position and the location of the target seat position in a spatial reference system. The location data identifying the current seat position and the location data identifying the target seat position can be extracted from images in imaging media showing the seat 132 in the current seat position and an image showing the seat in the target seat position.

In some aspects, the seat 132 is adjusted by the processing circuitry 150 using the seat actuator 142 until the seat 132 is within a threshold orientation displacement. In some embodiments, the threshold orientation displacement includes a front/back threshold displacement, a vertical threshold displacement, and a tilt threshold displacement. In some embodiments, the threshold displacement for each dimension of the seat position is zero or as close to zero possible based on detection and adjustment capabilities of the control system 102. Thus, in this case, a formal data parameter defining the threshold displacement does not have to be defined in the system. In other embodiments, the front/back threshold displacement, the vertical threshold displacement, and the tilt threshold displacement are each defined by a particular value provided in threshold orientation data. The threshold orientation data thus may formally define values for the front/back threshold displacement, the vertical threshold displacement, and/or the tilt threshold displacement describing tolerances that indicate an acceptable range of values for the different dimensions of the seat position relative to the target seat position.

The threshold orientation displacement either implicitly or explicitly defines an allowable tolerance for how close the current seat position has to be to the target seat position. Again, as mentioned above, the threshold orientation displacement may be defined for each dimension of the seat position. When the threshold orientation displacement is defined explicitly as threshold orientation displacement data, the processing circuitry 150 may use image processing to determine whether the current seat position is within the threshold orientation displacement defined by the threshold orientation displacement data.

For instance, with respect to the threshold front/back displacement of the seat 132, the threshold orientation displacement data may define threshold front/back displacement data that identifies the threshold front/back displacement (i.e., the front/back position tolerance). The processing circuitry 150 may use overlaying techniques to determine whether the current front/back location is within the threshold front/back displacement of the target front/back displacement location. If the current front/back location is within the threshold front/back displacement, the processing circuitry 150 determines that the seat actuator 142 does not need to be used to move the current front/back position of the seat 132. If the current front/back location is not within the threshold front/back displacement, the processing circuitry 150 determines that the seat actuator 142 does need to be used to move the current front/back position of the seat 132 closer to the target front/back position of the seat 132.

With respect to the threshold vertical displacement of the seat 132, the threshold orientation displacement data may define threshold vertical displacement data that identifies the threshold vertical displacement (i.e., the vertical position tolerance). The processing circuitry 150 may use overlaying techniques to determine whether the current vertical location is within the threshold vertical displacement of the target vertical displacement location. If the current vertical location is within the threshold vertical displacement, the processing circuitry 150 determines that the seat actuator 142 does not need to be used to move the current vertical position of the seat 132. If the current vertical location is not within the threshold vertical displacement, the processing circuitry 150 determines that the seat actuator 142 does need to be used to move the current vertical position of the seat 132 closer to the target vertical position of the seat 132.

With respect to the threshold tilt displacement of a seatback 146 of the seat 132, the threshold orientation displacement data may define threshold tilt displacement data that identifies the threshold tilt displacement (i.e., the tilt tolerance). The processing circuitry 150 may use overlaying techniques to determine whether the current tilt is within the threshold tilt displacement of the target tilt. If the current tilt is within the threshold tilt displacement, the processing circuitry 150 determines that the seat actuator 142 does not need to be used to move the current tilt position of the seatback 146 of the seat 132. If the current tilt location is not within the threshold tilt displacement, the processing circuitry 150 determines that the seat actuator 142 does need to be used to move the current tilt position of the seatback 146 of the seat 132 closer to the target tilt position of the seat 132. This camera-based approach eliminates the need for an array of sensors to determine seat position as part of the seat adjustment system. As mentioned above, the camera 101 may already be part of an existing driver monitoring system in the vehicle designed to monitor the driver's presence in real-time as a safety feature. In this way, an existing camera serves as an integral part of the seat adjustment system, resulting in cost savings.

Figures 1D, 1E:
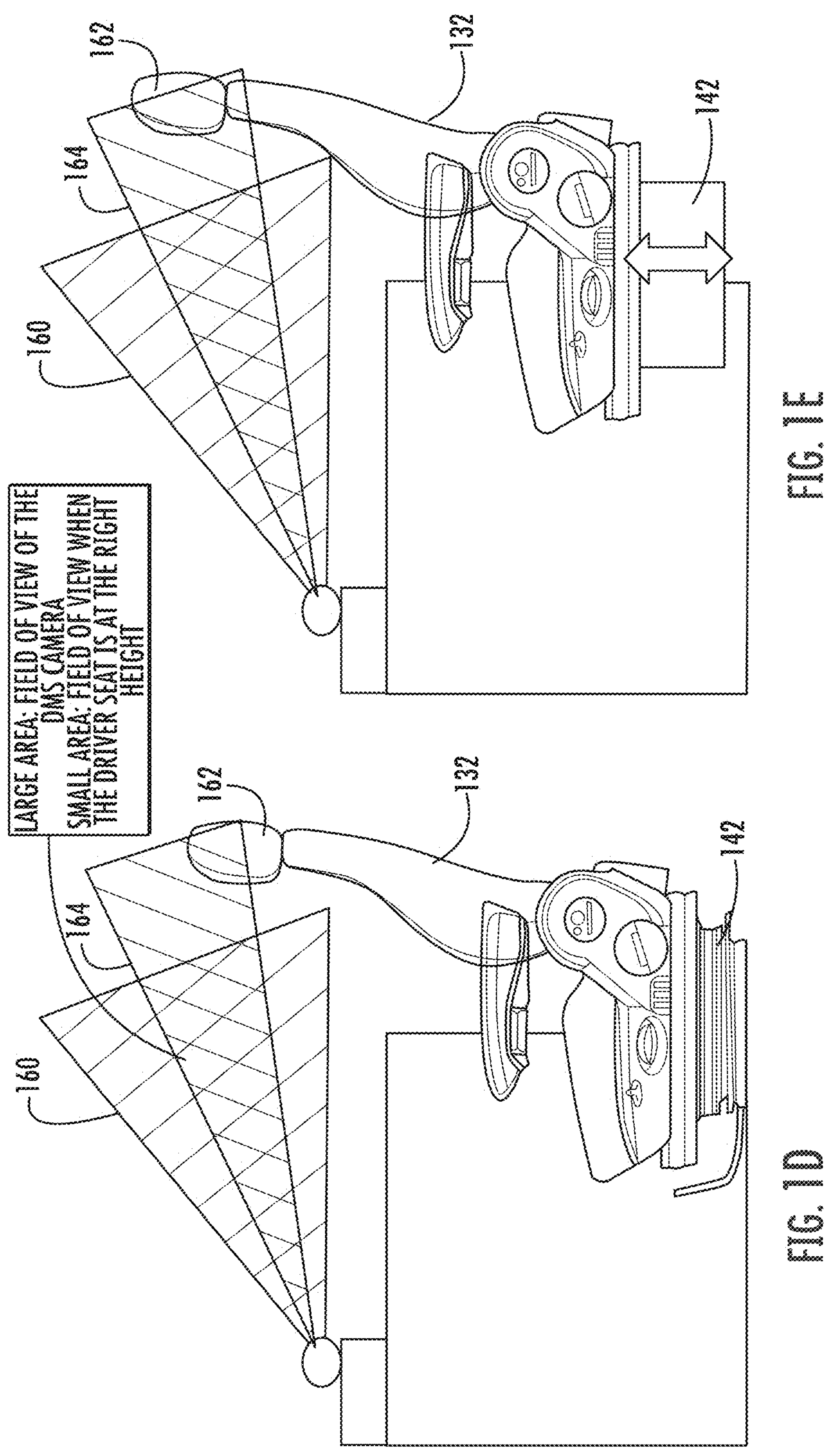
FIG. 1D is an exemplary seat in the driver's side compartment of the vehicle shown in FIG. 1A and FIG. 1B with the seat in a current vertical position that differs from a target vertical position.
FIG. 1E is an exemplary seat in the driver's side compartment of the vehicle shown in FIG. 1A and FIG. 1B with the seat in the target vertical position.

FIG. 1D-FIG. 1E illustrates the exemplary seat 132 in the driver's side compartment as the exemplary seat 132 is moved from a current vertical position to a target vertical position.

In FIG. 1D, the seat 132 is in a current vertical position that differs from a target vertical position. In this example, the seat actuator 142 includes a pneumatic height adjustment mechanism configured to move the seat 132 parallel to the vertical axis 144. The camera 101 (See FIG. 1B) is mounted on the dashboard 134 (See FIG. 1B) and is pointed towards the seat 132. The camera 101 has a field of view 160, which defines the volume of area that is capable of being captured by the camera 101. In some examples, a particular feature of the seat 132 is captured to determine the current seat position. For instance, the particular feature of the seat 132 may be a headrest 162 of the seat 132. Thus, the camera 101 is configured to capture the imaging media 158 (See FIG. 1C) with a visual representation of the seat 132. In FIG. 1D-FIG. 1E, the camera 101 is in a fixed location of the cabin 130 and is positioned at a fixed angle so that the area of the field of view 160 is fixed. In this example, the headrest 162 is also at a fixed position and is not adjustable with respect to the remainder of the seat 132. In other examples, the camera position, the camera angle, and/or the headrest position with respect to the remainder of the seat 132 is adjustable. In these other examples, the processing circuitry 150 is configured to provide adjustments to the camera angle and/or to imaging techniques in order to identify the current seat position and move the seat 132 towards a target seat position. The processing circuitry 150 (See FIG. 1C) is configured to process images in the imaging media 158 to identify a visual representation of the headrest 162. In this case, current vertical position data is extracted from the imaging media 158 that identifies a position of the headrest 162 of the seat 132. The target seat position data 156 includes a target vertical position that identifies a target vertical position of the headrest 162.

The headrest 162 appears within an area of interest 164, which is an area in the field of view of the camera 101 that is provided in a display. The area of interest 164 is a subrange of the field of view 160. In order for the seat 132 to be at the target vertical position, the headrest 162 should appear completely within a subrange of the area of interest that corresponds to the target vertical position. The processing circuitry 150 processes the imaging media 158 to determine that the current seat feature position of the headrest 162 is not at the target vertical position.

Since the current seat feature position of the headrest 162 was not at the target vertical position indicated by the target seat position data 156. As a result, the processing circuitry 150 is configured to operate the pneumatic height adjustment mechanism of the seat actuator 142 to move the seat 132 in a new vertical position where the difference between new vertical position is within the threshold vertical displacement of the target vertical position. The headrest 162 of the seat is within the area of interest 164, as shown in FIG. 1E.

Figures 1F, 1G:
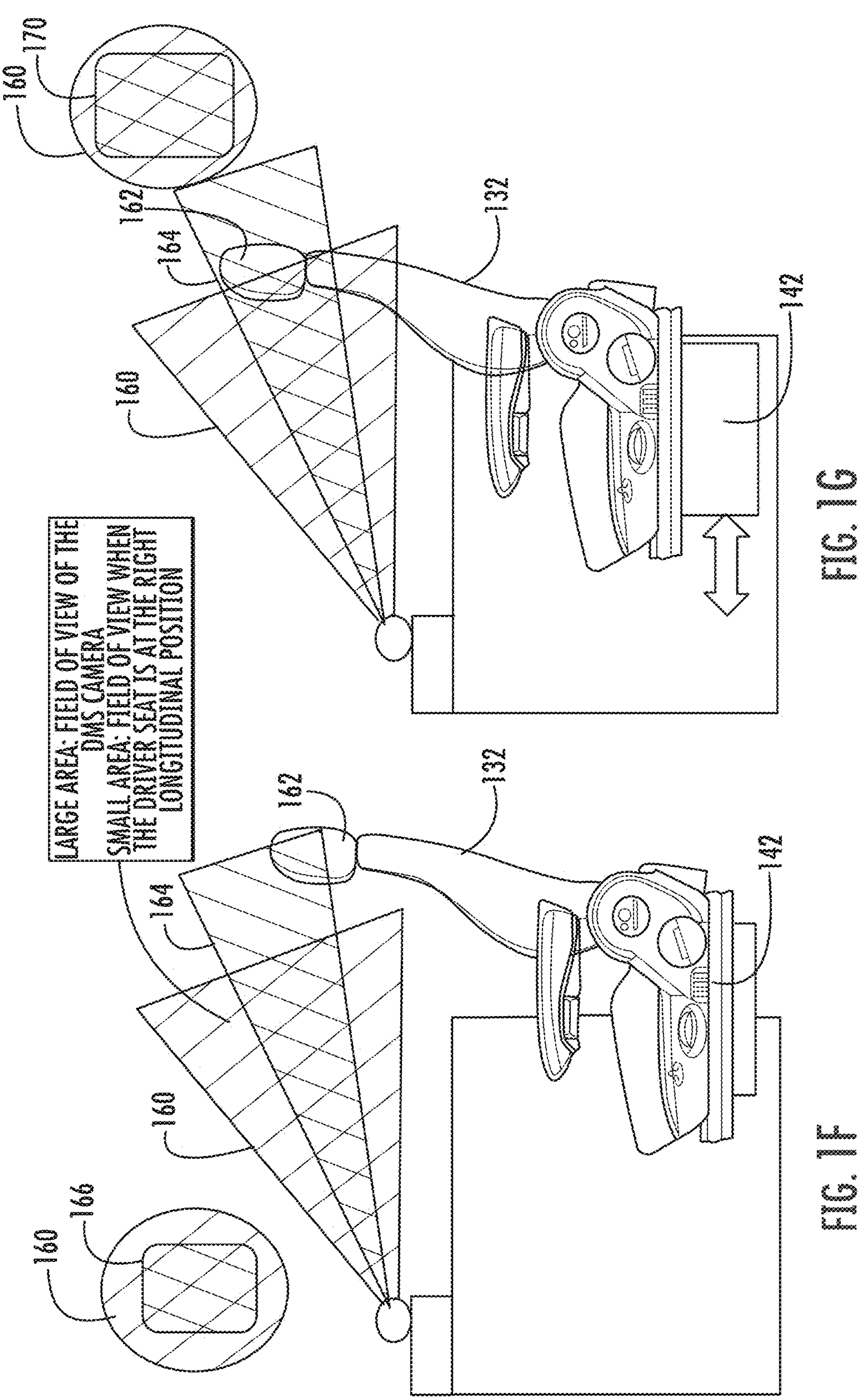
FIG. 1F is an exemplary seat in the driver's side compartment of the vehicle shown in FIG. 1A and FIG. 1B with the seat in a current front/back position that differs from a target front/back position.
FIG. 1G is an exemplary seat in the driver's side compartment of the vehicle shown in FIG. 1A and FIG. 1B with the seat in the target front/back position.

FIG. 1F-FIG. 1G is the exemplary seat 132 in the driver's side compartment as the exemplary seat 132 is moved from a current front/back position to a target front/back position. In FIG. 1F the exemplary seat is in the current front/back position that differs from a target front/back position. In FIG. 1F-FIG. 1G, the camera 101 is in a fixed location of the cabin 130 and is positioned at a fixed angle so that the area of the field of view 160 is fixed. In this example, the headrest 162 is also at a fixed position and is not adjustable with respect to the remainder of the scat 132. In other examples, the camera position, the camera angle, and/or the headrest position with respect to the remainder of the seat 132 is adjustable. In these other examples, the processing circuitry 150 is configured to provide adjustments to the camera angle and/or to imaging techniques in order to identify the current seat position and move the seat 132 towards a target scat position.

In this example, the seat actuator 142 includes an electromechanical mechanism configured to move the seat 132 parallel to the front/back axis 143. The camera 101 has an area of focus 166, which defines the size of the headrest 162 in the field of view 160 of the camera 101. In this case, current front/back position data is extracted from the imaging media 158 by determining a size of the visual representation of the headrest 162 of the seat 132 in the image. This gives an indication of the distance of the headrest 162 from the camera. In this example, the size of the visual representation of the headrest 162 indicates that the headrest 162 is not within the threshold front/back displacement of the target front/back displacement. The target seat position data 156 includes a target vertical position that identifies a target vertical position of the headrest 162.

The headrest 162 is also to be moved from the current front/back position to the target front back position. In this example, the target front/back position is in the area of interest 164, which again is a subrange of the field of view 160. The processing circuitry 150 processes the imaging media 158 to determine that the current seat feature position of the headrest 162 is not at the target vertical position.

The current seat feature position of the headrest 162 was not at the target front/back position indicated by the target seat position data 156. As a result, the processing circuitry 150 is configured to operate the electromechanical mechanism of the seat actuator 142 to move the seat 132 in a new front/back position where the difference between new front/back position is within the threshold front/back displacement of the target front/back position, as shown in FIG. 1G. As such, the headrest 162 of the seat has an area of focus 170 having a size that indicates that the headrest is at the appropriate front/back distance from the camera 101 to be at the target front/back position.

Figure 2:
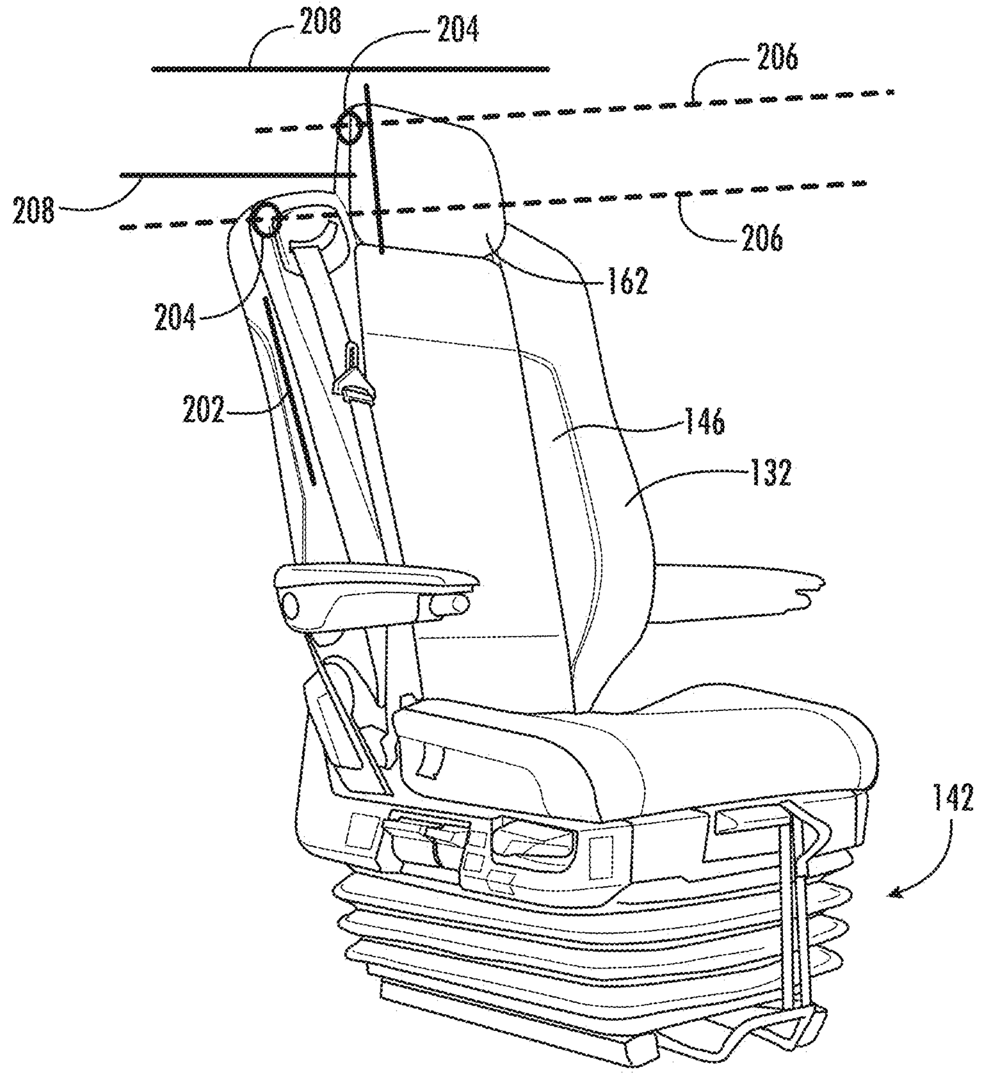
FIG. 2 is an exemplary seat in the driver's side compartment of the vehicle showing artifacts of the seat that are used to first adjust the tilt of a seatback of the seat, then adjust the front/back position of the seat, and then adjust the vertical position of the seat.

FIG. 2 is an exemplary seat in the driver's side compartment of the vehicle 100 showing artifacts of the seat 132 that are used to first adjust the tilt of a seatback 146 of the seat 132, then adjust the front/back position of the seat 132, and then adjust the vertical position of the seat 132.

In some embodiments, different features associated with the seat 132 are used to identify the seat position and to move the seat 132 to the target seat position. The control system 102 (See FIG. 1B) is configured to receive the target seat position data indicating a target seat portion position of the seat. With respect to the seat 132 shown in FIG. 2, the target seat position data 156 indicates a target tilt of the headrest 162 and lateral side 202 of the seat 132. In FIG. 2, the camera 101 is in a fixed location of the cabin 130 and is positioned at a fixed angle. In this example, the feature of interest (i.e., the feature used to identify the set position) is also at a fixed position and is not adjustable with respect to the remainder of the seat 132. In other examples, the camera position, the camera angle, and/or the position of the feature of interest is adjustable. In these other examples, the processing circuitry 150 is configured to provide adjustments to the camera angle and/or to imaging techniques in order to identify the current scat position and move the seat 132 towards a target seat position.

The target seat position data 156 (See FIG. 1B) indicates a target front/back position of markers 204 that are placed on the seat 132. Since the markers 204 are mounted to or are part of the seat 132, the markers 204 can also be used to indicate the position of the seat 132. In some aspects, the markers 204 are not part of the seat 132 but rather are artificial structures mounted or integrated into the seat. In other aspects, the markers are parts of the seat 132 that are treated with characteristics that are visible to the camera 101 but may not be visible to humans. The target scat portion position data indicates the target front/back position of the marker 204 seat 132 in the vehicle 100. The target seat position data 156 also indicates a target vertical position of the markers 204.

Prior to adjusting the seat 132, the seat 132 is presumed to be in a current seat position that is greater than a threshold orientation displacement from the target seat position. To begin, the processing circuitry 150 (See FIG. 1B) is configured to process the imaging media 158 by being configured to extract a representation of the headrest 162 in the imaging media 158. The processing circuitry 150 is configured to determine current headrest position data indicating a current headrest tilt of the headrest 162 based on the extracted representation of the headrest 162. It should be noted that use of the headrest 162 is simply exemplary and any other identifiable characteristic associated with the seat can also be utilized. The processing circuitry 150 then determines whether a difference between the current headrest tilt and the target headrest tilt is greater than a threshold tilt displacement.

In response to determining that the difference between the current headrest tilt and the target headrest tilt is greater than the threshold tilt displacement, the processing circuitry 150 controls the seat actuator 142 to move the seatback 146 so that the headrest 162 is in a new seat position until the current headrest tilt of the headrest 162 differs from the target headrest tilt by less than the threshold tilt displacement.

In response to the current headrest tilt of the headrest 162 differing from the target headrest tilt by less than the threshold tilt displacement, the processing circuitry 150 is configured to process the imaging media 158 by being configured to extract a representation of the markers 204 in the imaging media 158. The processing circuitry 150 is configured to determine current marker position data indicating a current front/back position of the markers 204 based on the extracted representation of the markers 204. It should be noted that use of the markers 204 is simply exemplary and any other identifiable characteristic associated with the seat 132 can also be utilized. The processing circuitry 150 then determines whether a difference between the current front/back position of the markers 204 and the target front/back position of the markers 204 is greater than a threshold front/back displacement.

In response to determining that the difference between the current front/back position of the markers 204 and the target front/back position of the markers 204 is greater than a threshold front/back displacement, the processing circuitry 150 controls the seat actuator 142 to move the markers 204 so that the markers 204 indicate a new seat position where the current front/back position of the markers 204 differs from the target front/back position by less than the threshold front/back position displacement. Since the headrest 162 is at the appropriate tilt, the markers 204 move along lines 206 until the difference between the current front/back position of the markers 204 and the target front/back position of the markers 204 is less than the threshold front/back displacement.

In response to the current front/back position of the markers 204 differing from the target front/back position by less than the threshold front/back displacement, the processing circuitry 150 is again configured to process the imaging media 158 by being configured to extract a representation of the markers 204 in the imaging media 158. The processing circuitry 150 is configured to determine current marker position data indicating a current vertical position of the markers 204 based on the extracted representation of the markers 204. It should be noted that use of the markers 204 is simply exemplary and any other identifiable characteristic associated with the seat 132 can also be utilized. The processing circuitry 150 then determines whether a difference between the current vertical position of the markers 204 and the target vertical position of the markers 204 is greater than a threshold vertical displacement.

In response to determining that the difference between the current vertical position of the markers 204 and the target vertical position of the markers 204 is greater than a threshold vertical displacement, the processing circuitry 150 controls the seat actuator 142 to move the markers 204 so that the markers 204 indicate a new seat position where the current vertical position of the markers 204 differs from the target vertical position by less than the threshold vertical position displacement. Since the headrest 162 is at the appropriate tilt, the markers 204 move toward lines 208 until the difference between the current vertical position of the markers 204 and the target vertical position of the markers 204 is less than the threshold vertical displacement.

Figure 3:
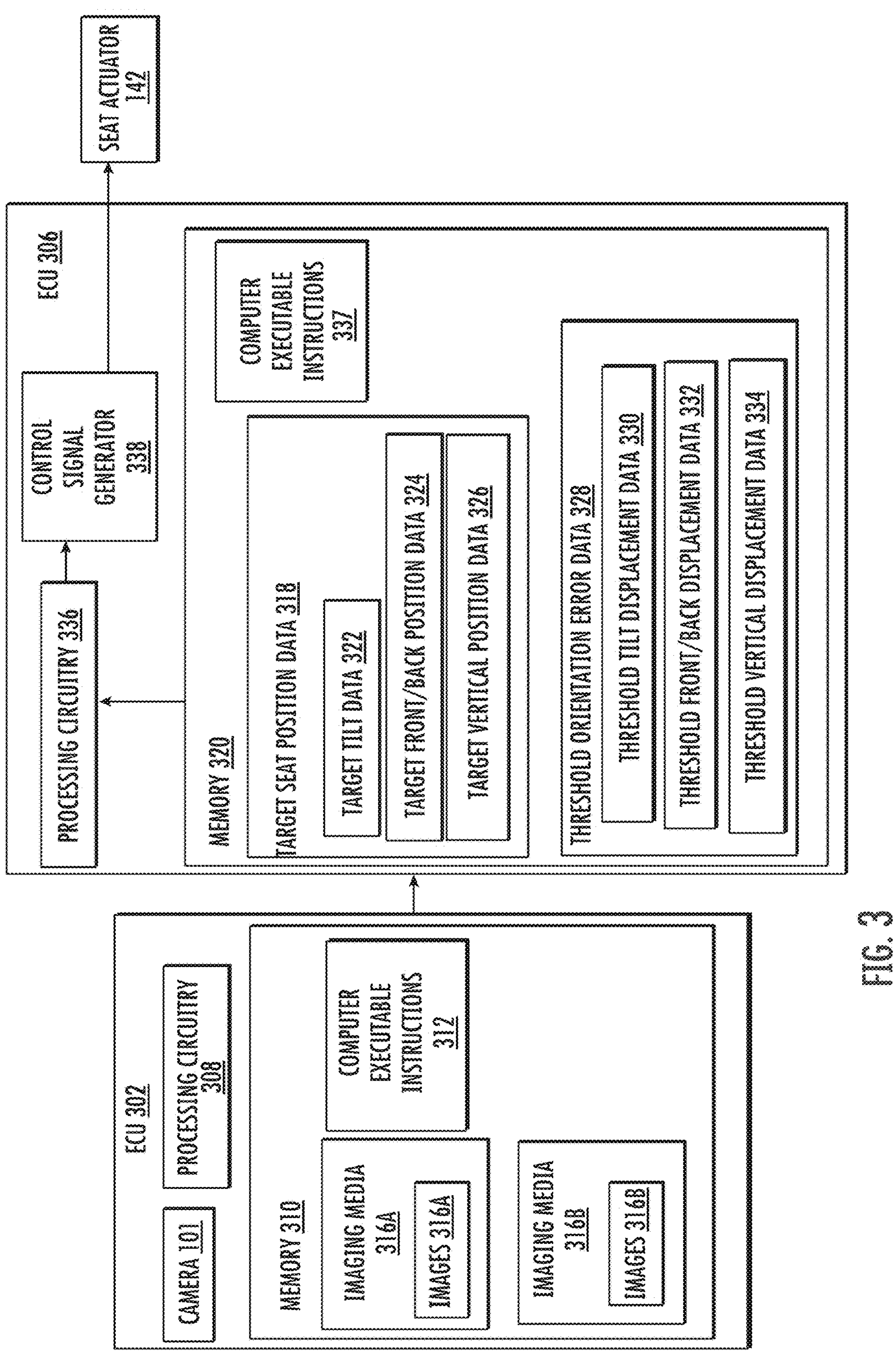
FIG. 3 is a block diagram of a control system that includes an electronic control unit (ECU) connected to and operating a camera, another ECU for determining seat location and that generates control signals for a seat actuator, and the seat actuator.

FIG. 3 is a block diagram of a control system 300 that includes an electronic control unit (ECU) 302 connected to and operating the camera 101, another ECU 306 for determining seat location and that generates control signals for the seat actuator 142, and the seat actuator 142. In some examples, the control system 300 is provided in the vehicle 100 to adjust the seat 132 from the current seat position to a target seat position, as described above with respect to FIG. 1A-FIG. 2. In this FIG. 3, the ECU 302 includes the camera 101, processing circuitry 308 and memory 310. The memory 310 is configured to store computer executable instructions 312, wherein the processing circuitry 308 is configured to execute the computer executable instructions 312. In other embodiments, the camera 101 includes the ECU 302. In other embodiments, a single ECU are provided in the control system 300 rather than two ECUs 302, 306. In other embodiments, more than two ECUs 302, 306 are provided in the control system 300.

In response to executing the computer executable instructions 312, the processing circuitry is configured to capture imaging media (referred to generically as imaging media 314 and specifically as imaging media 314A, 314B) and store the imaging media 314 in the memory 310. In some examples, the imaging media 314 are video streams of the seat 132 (See FIG. 1A and FIG. 1B) captured the camera 101. The imaging media 314 includes images (referred to generically as images 316 and specifically as images 316A, 316B. More specifically, the imaging media 314A includes images 316A and the imaging media 314B includes the images 318B.

The driver may operate real/virtual buttons in the vehicle 100 or smart device that indicate that the driver desires to record a target seat position. In response, the ECU 302 is configured to receive and store imaging media 316A of the seat from the camera 101 so that the driver can record a target seat position. The driver may then provide user inputs to the seat actuator (push real or virtual buttons) that allow the driver to move the seat 132 to the desired target seat position. The driver may then push real/virtual buttons when the seat 132 in the desired target seat position. In response, the ECU 302 may receive user input indicating that the seat 132 in the target seat position. In some examples, the ECU 302 records location coordinates indicating the target seat position in response to the user input that indicates that the seat 132 is in the target scat position. In other embodiments, one of the images 316A in the imaging media 314A is captured of the seat 132 in the target seat position in response to the user input that indicates that the seat 132 is in the target seat position. In some examples, the captured one of the images 316A is transmitted to the ECU 306 and stored as target seat position data 318 in the memory 320.

In other examples, the target seat position data 318 is stored as coordinates describing the target seat position. Accordingly, the processing circuitry 308 is configured to perform image processing techniques on the one of the images 316A that illustrates the seat 132 in the target seat position. The processing circuitry 308 is configured to process the image 316 with the seat 132 in the target seat position and generate target tilt data 322 that indicates the target tilt of the seatback 146. Additionally, the processing circuitry 308 is configured to process the image 316 with the seat 132 in the target seat position and generate target front/back position data 324 that indicates the target front/back position of the seat 132. Finally, the processing circuitry 308 is configured to process the image 316 with the seat 132 in the target seat position and generate target vertical position data 326 that indicates the target vertical position of the seat 132.

The ECU 306 also stores threshold orientation displacement data 328 that indicates a threshold orientation displacement. The threshold orientation displacement describes how close the seat position has to be to the target seat position to consider the seat position in the correct recorded seat position. The threshold orientation displacement data 328 is optional as it may be that, in order for the threshold orientation displacement to be satisfied, the seat position is equal to the target seat position. In other implementations, the seat actuator 142 is only capable of moving the seat 132 to certain discrete positions. Thus, no threshold orientation displacement as the seat position simply is provided in the available seat position that is closest to the target seat position.

However, in some examples, like the example shown in FIG. 3, the threshold orientation displacement data 328 is stored in the memory 320 to indicate tolerance values indicating the degree of displacement permitted in order for the seat position to be considered in the correct recorded seat position. In FIG. 3, the threshold orientation displacement data 328 includes threshold tilt displacement data 330 that indicates a threshold tilt displacement quantitively describing the tilt tolerance between the tilt of the seatback 146 and the target tilt of the seatback 146. In FIG. 3, the threshold orientation displacement data 328 includes threshold front/back displacement data 332 that indicates a threshold front/back displacement quantitively describing the front/back tolerance between the front/back position of the seat 132 and the target front/back displacement of the seat 132. In FIG. 3, the threshold orientation displacement data 328 includes threshold vertical displacement data 334 that indicates a threshold vertical displacement quantitively describing the vertical tolerance between the vertical position of the seat 132 and the target vertical displacement of the seat 132.

In response to a trigger that the seat 132 is to be automatically adjusted to the target scat position, processing circuitry 336 in the ECU 306 is configured to receive target scat position data, which is the image 316A of the seat 132 in the target seat position or the target seat position data 318 identifying quantitative coordinates for the target seat position. The memory 320 is configured to store computer executable instructions 337. In response to executing the computer executable instructions, the processing circuitry 336 is configured to perform the functions described below.

First, the processing circuitry 336 is then configured to receive imaging media 314B that includes images 316B of the seat 132 in the current seat position. Also, the processing circuitry 336 is then configured to processes the imaging media 314B to determine the current seat position relative to the target position indicated by the target seat position data. By utilizing the camera 101 to determine the current seat position, various different sensors are not needed to determine the current seat position and its displacement relative to the target scat position. The imaging media 314B with the images 316B of the seat 132 depict all of the dimensions of the current seat position simultaneously as well as any effects of a driver's body weight on the seat 132.

In response to executing the computer executable instructions 337, the processing circuitry 308 then determines adjustments to the current seat position so that the current seat position is moved toward the target seat position in response to the current scat position not being within the threshold orientation displacement. Note that the processes of determining adjustments for the current seat position by processing the imaging media 314B can be repeated individually for the tilt, the front/back position, and the vertical position. In response to executing the computer executable instructions 337, the processing circuitry 336 converts the determined adjustments into commands that are transmitted to the control signal generator 338 in the ECU 306. The control signal generator 338 then adjusts the seat 132 to a new seat position that is within the threshold orientation displacement (in some examples, as defined by the threshold orientation displacement data 328) of the target seat position. These blocks are repeated iteratively until the new seat position is within the threshold orientation displacement of the target seat position.

Figure 4A:
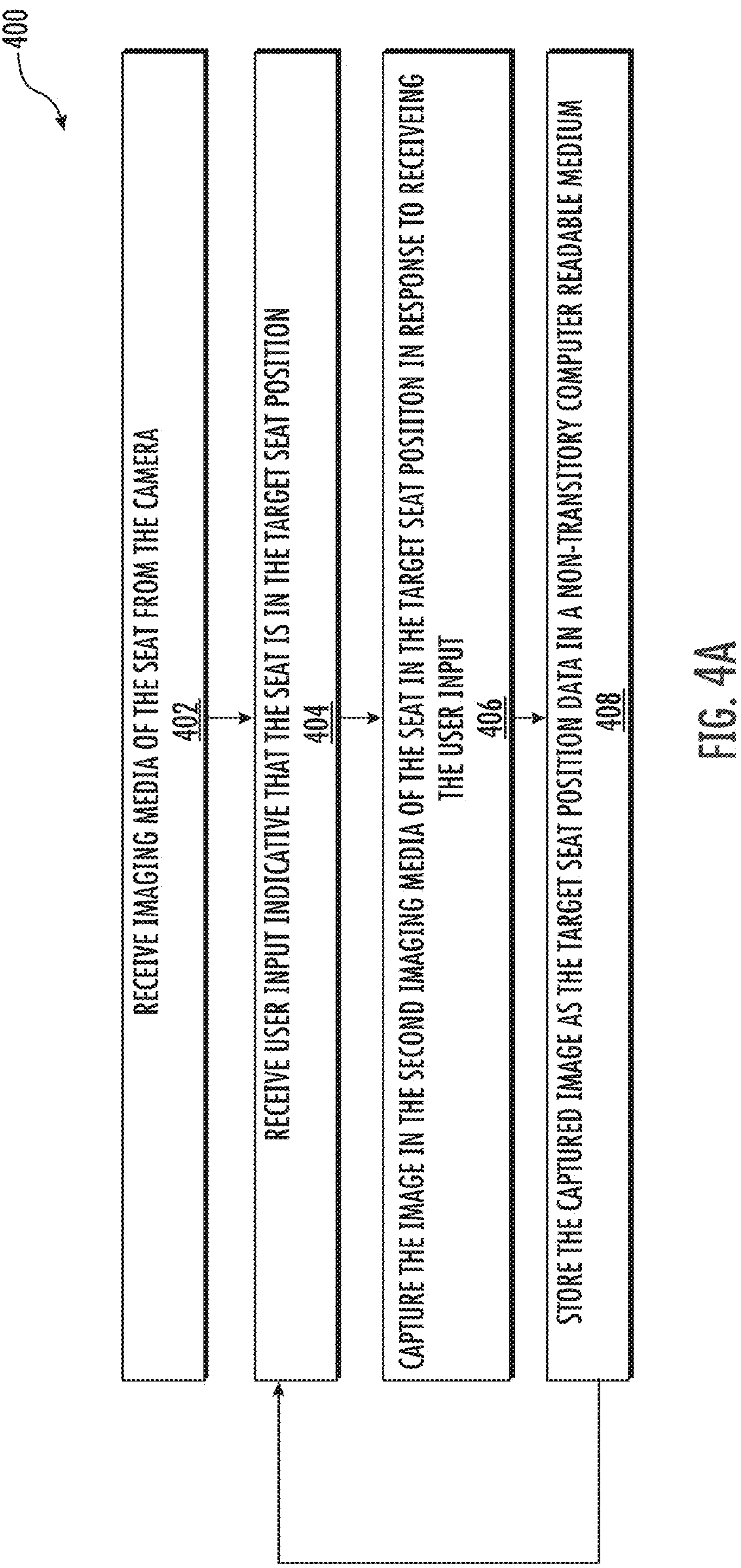
FIG. 4A is flow chart illustrating an exemplary process of recording target seat position data as an image of a seat in a target seat position in response to an occupant of the seat indicating that the seat is in the target seat position and storing the target seat position data so that a control system in the vehicle can receive the target seat position data when the seat is to be adjusted to the target seat position.

FIG. 4A is process 400 illustrating an exemplary process of recording target scat position data as an image of a seat in a target seat position in response to an occupant of the seat indicating that the seat is in the target seat position and storing the target seat position data so that a control system in the vehicle can receive the target seat position data when the seat is to be adjusted to the target seat position. In some examples, the process 400 is performed by the control system 102 in FIG. 1C, the control system 300 in FIG. 3, or the computer system 1100 in FIG. 11. In some examples, the seat is the seat 132 described above with respect to FIG. 1A-FIG. 2. In some embodiments, the image is one of the images in the imaging media 158 or one of the images 316A in the imaging media 314A. An example of the vehicle is the vehicle 100 in FIG. 1A-FIG. 1C. The process 400 includes blocks 402-408. Flow beings at block 402.

Imaging media is received of the seat from the camera (block 402 in FIG. 4A). In some examples, the camera is the camera 101 in FIG. 1A, FIG. 1B, and FIG. 3. In some examples, the imaging media is received in response to a user input that indicates that a driver is going to record a target seat position. Flow then proceeds to block 404.

A user input indicative that the seat is in the target seat position is received (block 404 in FIG. 4A). For example, the driver while sitting in the seat may adjust the seat to a desired scat position. Once the driver has positioned the seat to the desired seat position, the driver may press a button in the vehicle or in a smart device to indicate that the seat is now in the desired scat position and the desired seat position should be recorded as the target seat position. Flow then proceeds to block 406.

The image in the imaging media is captured of the seat in the target scat position in response to receiving the user input (block 406 in FIG. 4A). Flow then proceeds to block 408.

The captured image is stored as target seat position data in a non-transitory computer readable medium (block 408 in FIG. 4A). In this manner, the captured image can be read from the non-transitory computer readable medium when the seat is to again be positioned in the target seat position. Examples of the non-transitory computer readable medium include the memory 152 in FIG. 1C and the memory in FIG. 3.

Figure 4B:
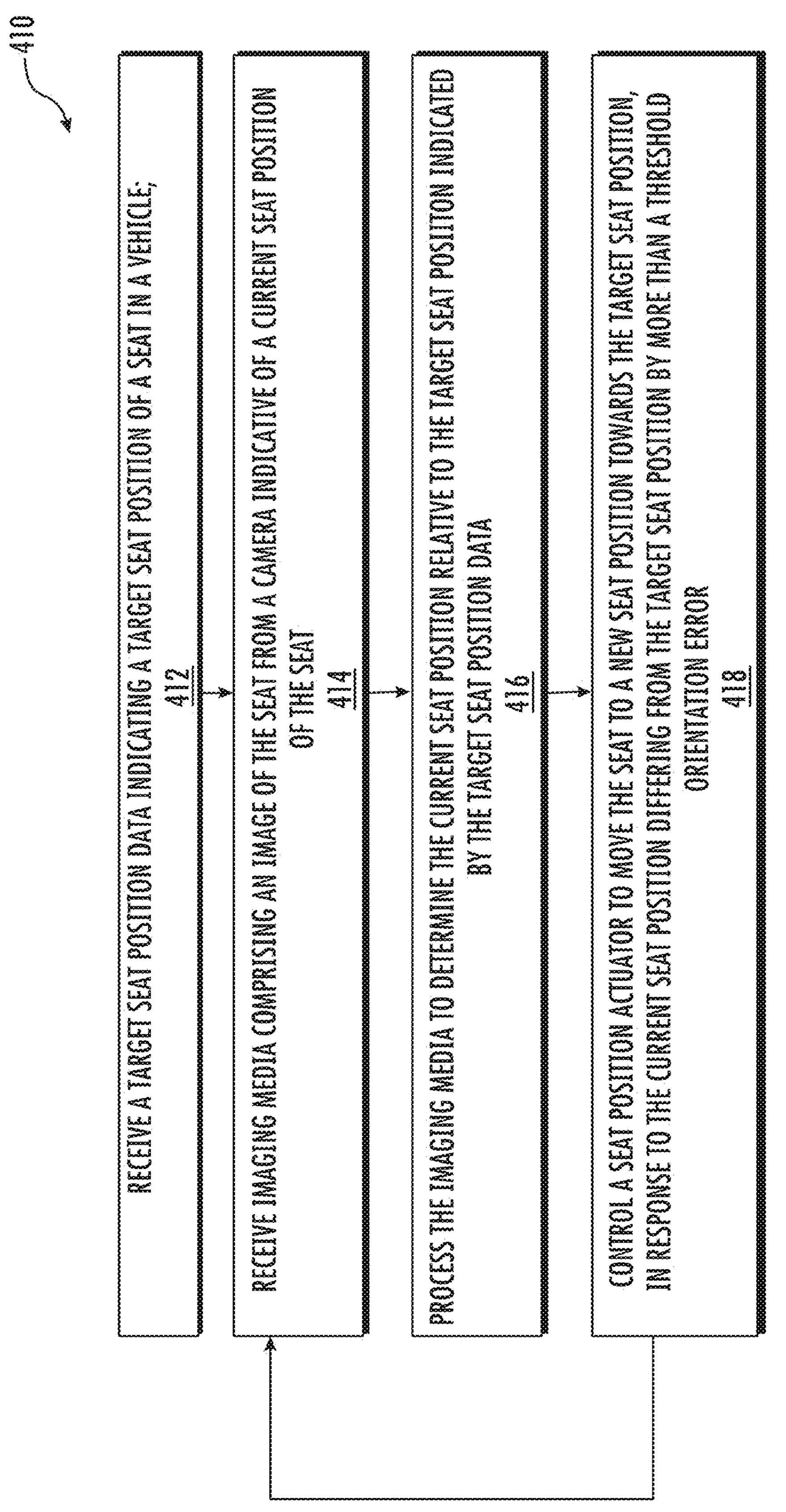
FIG. 4B is a flow chart illustrating an exemplary process of adjusting a seat to a target seat position where imaging media captured by a camera associated with the vehicle is processed to determine adjustments made by a seat actuator to move a current seat position of the seat to the target seat position.

FIG. 4B is a process 410 illustrating an exemplary process of adjusting the seat 132 to a target seat position where imaging media captured by a camera associated with the vehicle is processed to determine adjustments made by a seat actuator to move a current seat position of the scat to the target seat position. In some examples, the process 410 is performed by the control system 102 in FIG. 1C, the control system 300 in FIG. 3, or the computer system 1100 in FIG. 11. In some examples, the seat is the seat 132 described above with respect to FIG. 1A-FIG. 2. In some embodiments, the image is one of the images in the imaging media 158 or one of the images 316B in the imaging media 314B. An example of the vehicle is the vehicle 100 in FIG. 1A-FIG. 1C. The process 410 includes blocks 412-418. Flow beings at block 412.

The target seat position data is received indicating a target seat position of the seat in the vehicle (block 412 in FIG. 4B). In some examples, the target seat position data is the captured image obtained by performing the blocks 402-408. In some examples, the target scat position data is the target seat position data 156 shown in FIG. 1C, one or more of the images 316A of the seat in the target seat position, or the target seat position data 318 in FIG. 3. Flow then proceeds to block 414.

Imaging media is received including an image of the seat from a camera indicative of a current seat position of the seat (block 414 in FIG. 4B). In some examples, the camera is the camera 101 in FIG. 1A, FIG. 1B, and FIG. 3. By utilizing the imaging media, the images in the imaging media capture all of the various dimensions related to the current seat position and in this manner do not require a multitude of sensors to keep track of the seat position. Flow then proceeds to block 416.

The imaging media is processed to determine the current seat position relative to the target set position indicated by the target seat position data (block 416 in FIG. 4B). In some embodiments, the image of the seat in the target seat position is overlayed over the image of the seat in the current seat position. From this, the difference in orientation between the current seat position and the target seat position can be extracted. In other examples, quantitative coordinates of the current seat position are extracted from the image of the seat in the current seat position. The quantitative coordinates of the target seat position are obtained from the target scat position. The difference in orientation between the current seat position and the target seat position are determined by calculating the difference from the target seat position. Flow then proceeds to block 418.

The seat position actuator is controlled to move the seat to a new seat position that is towards the target seat position, in response to the current seat position differing from the target scat position by more than a threshold orientation displacement (block 418 in FIG. 4B). In some examples, the seat position actuator is the seat actuator 142 in FIG. 1A and in FIG. 3. In some examples, the threshold orientation displacement is simply implicit in that it simply means that the current seat position needs to equal the target seat position or the current seat position needs to be as close as mechanically possible given the mechanism employed by the seat actuator. In other examples, the threshold orientation displacement is defined in threshold orientation displacement data (e.g. threshold orientation displacement data 328 in FIG. 3), which defines orientation tolerances for the different dimensions of the seat position.

In some examples, the processing circuitry is configured to iteratively perform blocks 414-418 until the current seat position does not differ from the target seat position by more than the threshold orientation displacement. In some examples, blocks 414-418 are performed separately for the tilt of the seatback, the front/back position of the seat, and the vertical position of the seat. In some examples, blocks 414-418 are performed separately for the tilt of the seatback, the front/back position of the seat, and the vertical position of the seat but are simultaneously performed in parallel. In other examples, blocks 414-418 are performed separately for the tilt of the seatback, the front/back position of the seat, and the vertical position of the seat so that each is performed blocks 414-418 sequentially for the different dimensions. In some examples, blocks 414-418 are performed until the new seat position is within the threshold orientation displacement.

Figure 5:
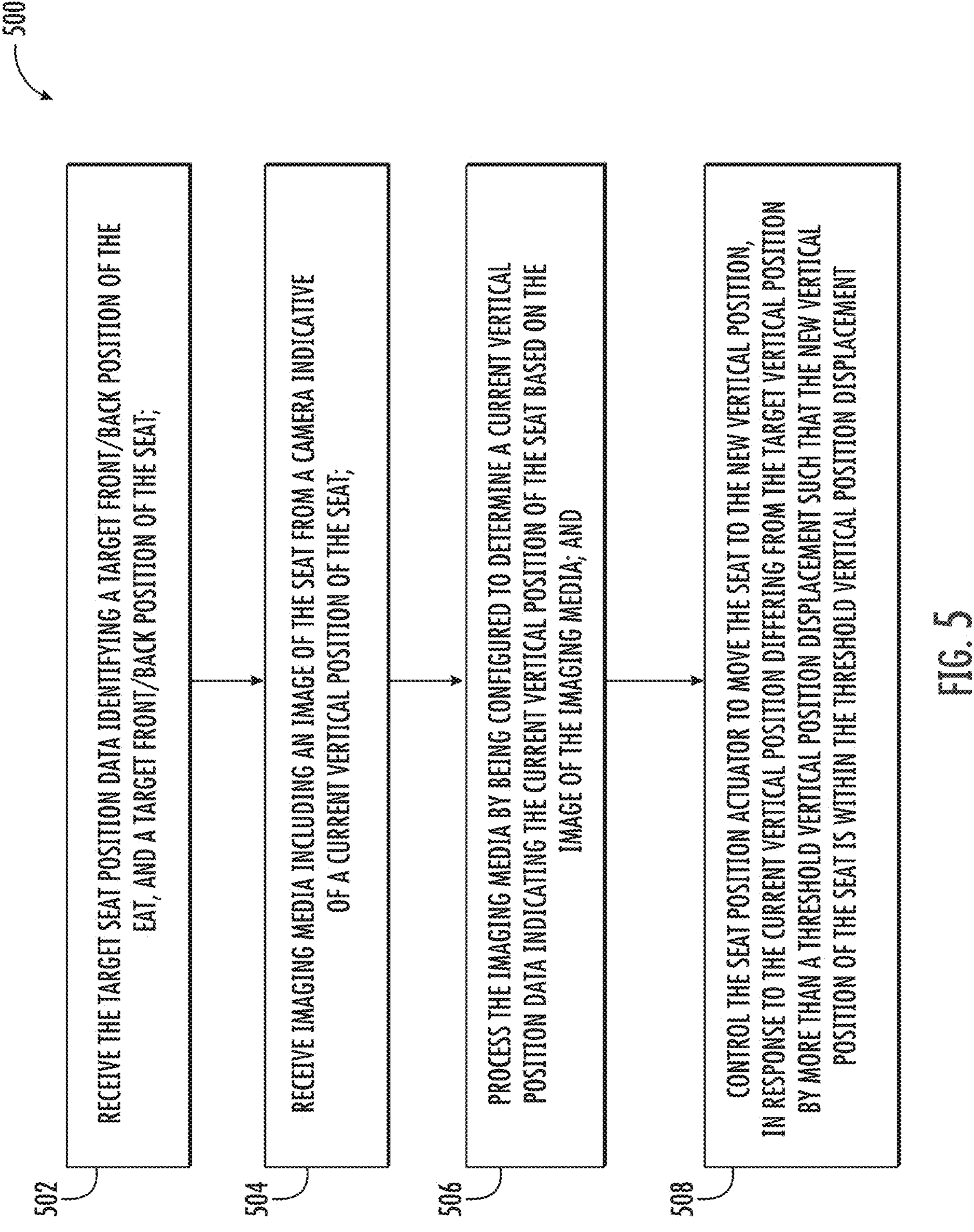
FIG. 5 is a flow chart illustrating an exemplary process of adjusting a seat to a target front/back position where imaging media captured by a camera associated with the vehicle is processed to determine adjustments made by a seat actuator to the current front/back position of the seat.

FIG. 5 is a process 500 illustrating an exemplary process of adjusting a seat to a target front/back position where imaging media captured by a camera associated with the vehicle is processed to determine adjustments made by a seat actuator to the current front/back position of the seat. In some examples, the process 500 is performed by the control system 102 in FIG. 1C, the control system 300 in FIG. 3, or the computer system 1100 in FIG. 11. In some examples, the seat is the seat 132 described above with respect to FIG. 1A-FIG. 2. In some embodiments, the image media is the imaging media 158 or the imaging media 314B. An example of the vehicle is the vehicle 100 in FIG. 1A-FIG. 1C. The process 500 is an example of the process 410 in FIG. 4 where the blocks are focused on the front/back position of the seat. process 500 includes blocks 502-508. A depiction of blocks 504-508 is shown in FIG. 1F-FIG. 1G. Flow beings at block 502.

The target seat position data is received that identifies a target front/back position of the seat (block 502 in FIG. 5). An example of receiving the target seat position data would be receiving one or more of the images 316A depicting the seat 132 in the target front/back position. In another example of receiving the target seat position data is receiving the target front/back position data 324 in FIG. 3. Block 502 is an example of block 412 in FIG. 4. Flow proceeds to block 504.

Imaging media is received including an image of the seat from a camera indicative of a current front/back position of the seat (block 504 in FIG. 5). An example of the seat in the current scat position is shown in FIG. 1F. In some embodiments, the image is one of the images in the imaging media 158 or one of the images 316B in the imaging media 314B. Block 504 is an example of block 414. Flow proceeds to block 506.

The imaging media is processed by being configured to determine a current front/back position data indicating the current front/back position of the seat based on the image of the imaging media (block 506 in FIG. 5). Block 506 is an example of block 416. Flow then proceeds to block 508.

The seat position actuator is controlled to move the seat to the new front/back position, in response to the current front/back position differing from the target front/back position by more than a threshold front/back position displacement such that the new front/back position of the seat is within the threshold front/back position displacement (block 508 in FIG. 5). An example of the seat being in the new front/back position that is within the threshold front/back position displacement is shown in FIG. 1G. Block 508 is an example of block 418.

Figure 6:
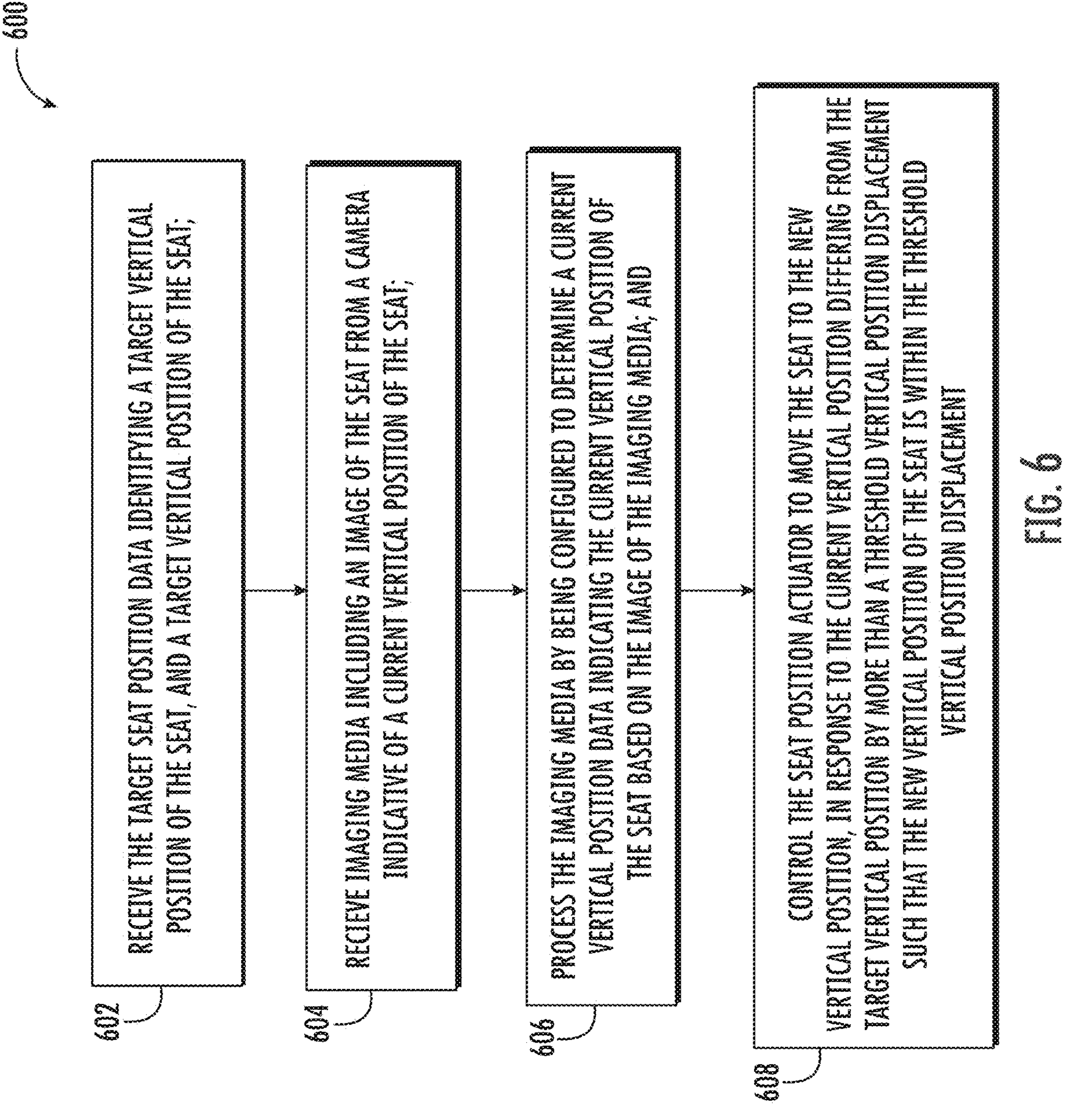
FIG. 6 is a flow chart illustrating an exemplary process of adjusting a seat to a target vertical position where imaging media captured by a camera associated with the vehicle is processed to determine adjustments made by a seat actuator to the current vertical position of the seat.

FIG. 6 is a process 600 illustrating an exemplary process of adjusting a seat to a target vertical position where imaging media captured by a camera associated with the vehicle is processed to determine adjustments made by a seat actuator to the current vertical position of the seat. In some examples, the process 600 is performed by the control system 102 in FIG. 1C, the control system 300 in FIG. 3, or the computer system 1100 in FIG. 11. In some examples, the seat is the seat 132 described above with respect to FIG. 1A-FIG. 2. In some embodiments, the image media is the imaging media 158 or the imaging media 314B. An example of the vehicle is the vehicle 100 in FIG. 1A-FIG. 1C. The process 500 is an example of the process 410 in FIG. 4 where the blocks are focused on the vertical position of the seat. Process 600 includes blocks 602-608. A depiction of blocks 604-608 is shown in FIG. 1D-FIG. 1E. Flow beings at block 602.

The target seat position data is received that identifies a target vertical position of the scat (block 602 in FIG. 6). An example of receiving the target scat position data would be receiving one or more of the images 316A depicting the seat 132 in the target vertical position. In another example of receiving the target seat position data is receiving the target vertical position data 326 in FIG. 3. Block 602 is an example of block 412 in FIG. 4. Flow proceeds to block 604.

Imaging media is received including an image of the seat from a camera indicative of a current vertical position of the seat (block 604 in FIG. 6). An example of the seat in the current scat position is shown in FIG. 1E. In some embodiments, the image is one of the images in the imaging media 158 or one of the images 316B in the imaging media 314B. Block 604 is an example of block 414 in FIG. 4. Flow proceeds to block 606.

The imaging media is processed by being configured to determine a current vertical position data indicating the current vertical position of the seat based on the image of the imaging media (block 606 in FIG. 6). Block 606 is an example of block 416 in FIG. 4. Flow then proceeds to block 608.

The seat position actuator is controlled to move the seat to the new vertical position, in response to the current vertical position differing from the target vertical position by more than a threshold vertical position displacement such that the new vertical position of the seat is within the threshold vertical position displacement (block 608 in FIG. 6). An example of the seat being in the new vertical position that is within the threshold vertical position displacement is shown in FIG. 1E. Block 608 is an example of block 418 in FIG. 4.

Figure 7:
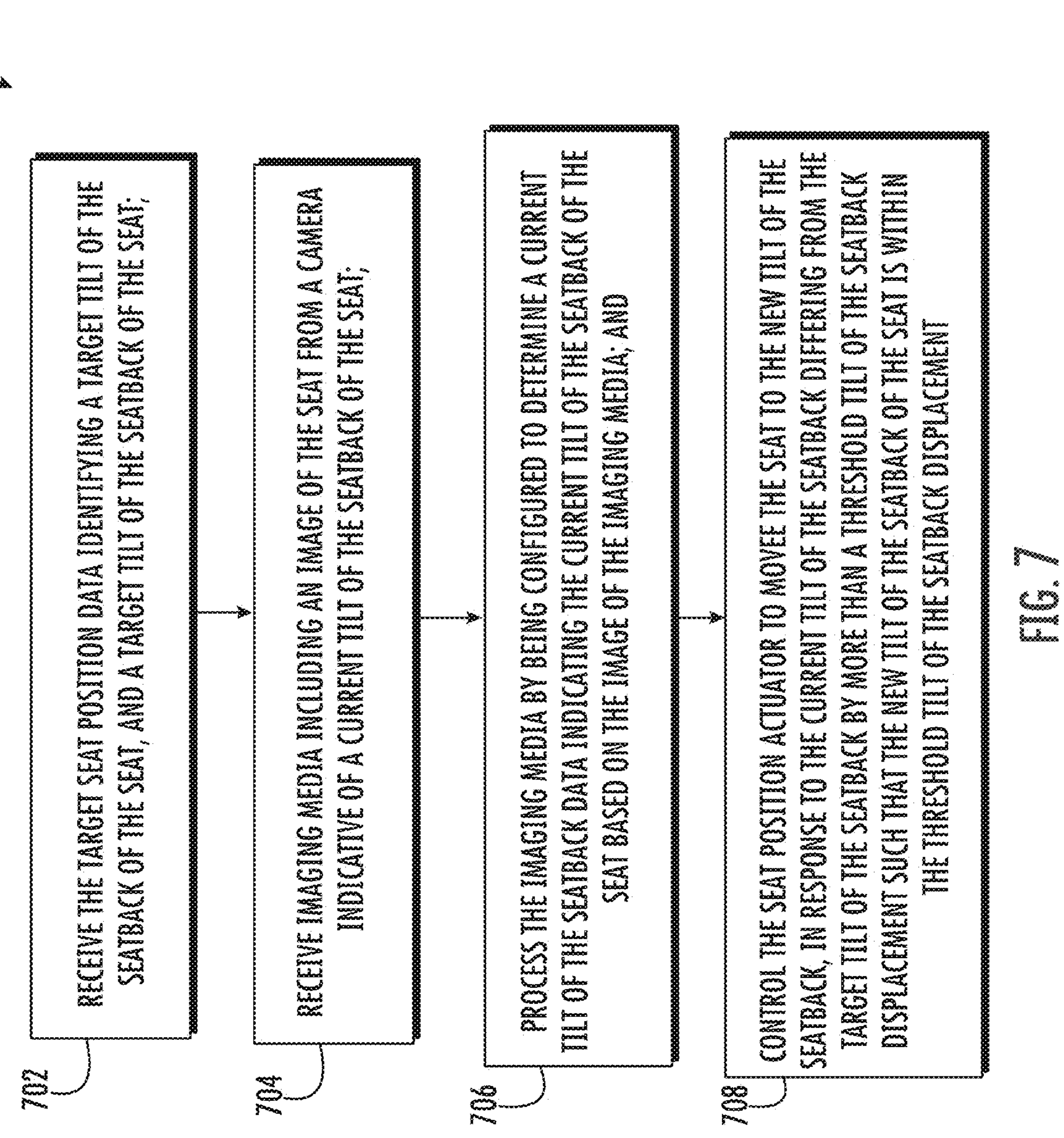
FIG. 7 is a flow chart illustrating an exemplary process of adjusting a seatback of a seat to a target tilt where imaging media captured by a camera associated with the vehicle is processed to determine adjustments made by a seat actuator to the current tilt of the seatback of the seat.

FIG. 7 is a flow chart illustrating an exemplary process 700 of adjusting a scat to a target tilt of the seatback where imaging media captured by a camera associated with the vehicle is processed to determine adjustments made by a seat actuator to the current tilt of the seatback of the scat.

In some examples, the process 700 is performed by the control system 102 in FIG. 1C, or the control system 300 in FIG. 3. In some examples, the seat is the seat 132 and the seatback is the seatback 146 described above with respect to FIG. 1A-FIG. 2. In some embodiments, the image media is the imaging media 158 or the imaging media 314B. An example of the vehicle is the vehicle 100 in FIG. 1A-1C. The process 500 is an example of the process 410 in FIG. 4 where the blocks are focused on the tilt of the seatback of the seat. process 700 includes blocks 702-708. A depiction of blocks 704-708 is shown in FIG. 2 when the seat 132 is being adjusted to the lines 208. Flow begins at block 702.

The target seat position data is received that identifies a target tilt of the seatback of the scat (block 702 in FIG. 7). An example of receiving the target seat position data would be receiving one or more of the images 316A depicting the seat 132 in the target tilt of the seatback. Another example of receiving the target seat position data is receiving the target tilt data 322 in FIG. 3. Block 702 is an example of block 412 in FIG. 4. Flow proceeds to block 704.

Imaging media is received including an image of the seat from a camera indicative of a current tilt of the seatback of the seat (block 704 in FIG. 7). An example of the seat in the current seat position is shown in FIG. 1E. In some embodiments, the image is one of the images in the imaging media 158 or one of the images 316B in the imaging media 314B. Block 704 is an example of block 414 in FIG. 4. Flow proceeds to block 706.

The imaging media is processed by being configured to determine a current tilt of the seatback data indicating the current tilt of the seatback of the seat based on the image of the imaging media (block 706 in FIG. 7). Block 706 is an example of block 416 in FIG. 4. Flow then proceeds to block 708.

The seat position actuator is controlled to move the seat to the new tilt of the seatback, in response to the current tilt of the seatback differing from the target tilt of the seatback by more than a threshold tilt displacement such that the new tilt of the seatback of the seat is within the threshold tilt displacement (block 708 in FIG. 7). An example of the seat being in the new tilt of the seatback that is within the threshold tilt displacement is shown in FIG. 2 when moving the seat 132 to the lines 208. Block 708 is an example of block 418 in FIG. 4.

Figure 8A:
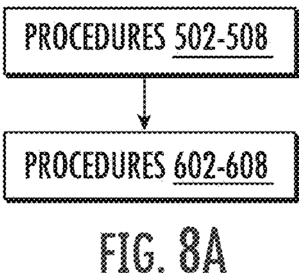
FIG. 8A is a flow chart illustrating an exemplary process of adjusting a seat position of a seat in a vehicle is to a target seat position where the front/back position of the seat is adjusted to a target front/back position and then a vertical position of the seat is adjusted to a target vertical position.

FIG. 8A is a flow chart illustrating an exemplary process 800 of adjusting a seat position of a seat in a vehicle is to a target seat position where the front/back position of the seat is adjusted to a target front/back position and then a vertical position of the seat is adjusted to a target vertical position. In FIG. 8A, blocks 502-508 from process 500 of FIG. 5 are temporally performed first so that the front/back position of the seat in the vehicle is provided within the threshold front/back displacement of the target front/back position. In response to performing blocks 502-508, blocks 602-608 from process 600 of FIG. 6 are temporally performed next so that the vertical position is provided within the threshold vertical displacement of the target vertical position. In some examples of FIG. 8A, the blocks depicted in FIGS. 1F and 1G and performed first and then the blocks FIG. 1D and FIG. 1E are subsequently performed.

Figure 8B:
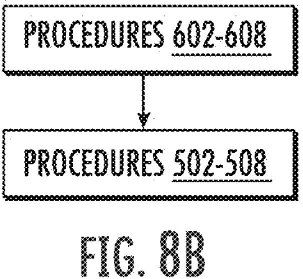
FIG. 8B is a flow chart illustrating an exemplary process of adjusting a seat position of a seat in a vehicle is to a target seat position where the vertical position of the seat is adjusted to a target vertical position and then a front/back position of the seat is adjusted to a target front/back position.

FIG. 8B is a flow chart illustrating an exemplary process of adjusting a seat position of a seat in a vehicle is to a target seat position where the vertical position of the seat is adjusted to a target vertical position and then a front/back position of the seat is adjusted to a target front/back position. In FIG. 8B, blocks 602-608 from process 600 of FIG. 6 are temporally performed first so that the vertical position of the seat in the vehicle is provided within the threshold vertical displacement of the target vertical position. In response to performing blocks 602-608, blocks 502-508 from process 500 of FIG. 5 are temporally performed next so that the front/back position is provided within the threshold front/back displacement of the target front/back position. In some examples of FIG. 8B, the blocks depicted in FIG. 1D and FIG. 1E and performed first and then the blocks FIG. 1F and FIG. 1G are subsequently performed.

Figure 8C:
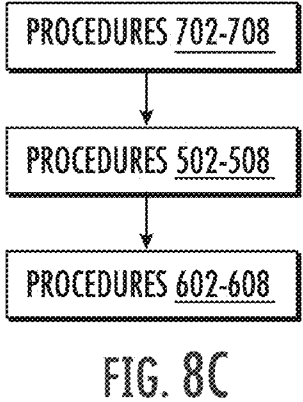
FIG. 8C is a flow chart illustrating an exemplary process of adjusting a seat position of a seat in a vehicle is to a target seat position where a tilt of a seatback of the seat is adjusted to a target tilt, then the front/back position of the seat is adjusted to a target front/back position and finally a vertical position of the seat is adjusted to a target vertical position.

FIG. 8C is a flow chart illustrating an exemplary process of adjusting a seat position of a seat in a vehicle is to a target seat position where a tilt of a seatback of the seat is adjusted to a target tilt, then the front/back position of the seat is adjusted to a target front/back position and finally a vertical position of the seat is adjusted to a target vertical position. In FIG. 8C, blocks 702-708 from process 700 of FIG. 7 are temporally performed first so that the tilt position of the seatback of the seat in the vehicle is provided within the threshold tilt displacement of the target tilt position. In response to performing blocks 702-708, blocks 502-508 from process 500 of FIG. 5 are temporally performed next so that the front/back position of the seat in the vehicle is provided within the threshold front/back displacement of the target front/back position. In response to performing blocks 502-508, blocks 602-608 from process 600 of FIG. 6 are temporally performed afterward so that the vertical position is provided within the threshold vertical displacement of the target vertical position. In some examples of FIG. 8C, the blocks depicted in FIG. 2 are performed.

Figure 9:
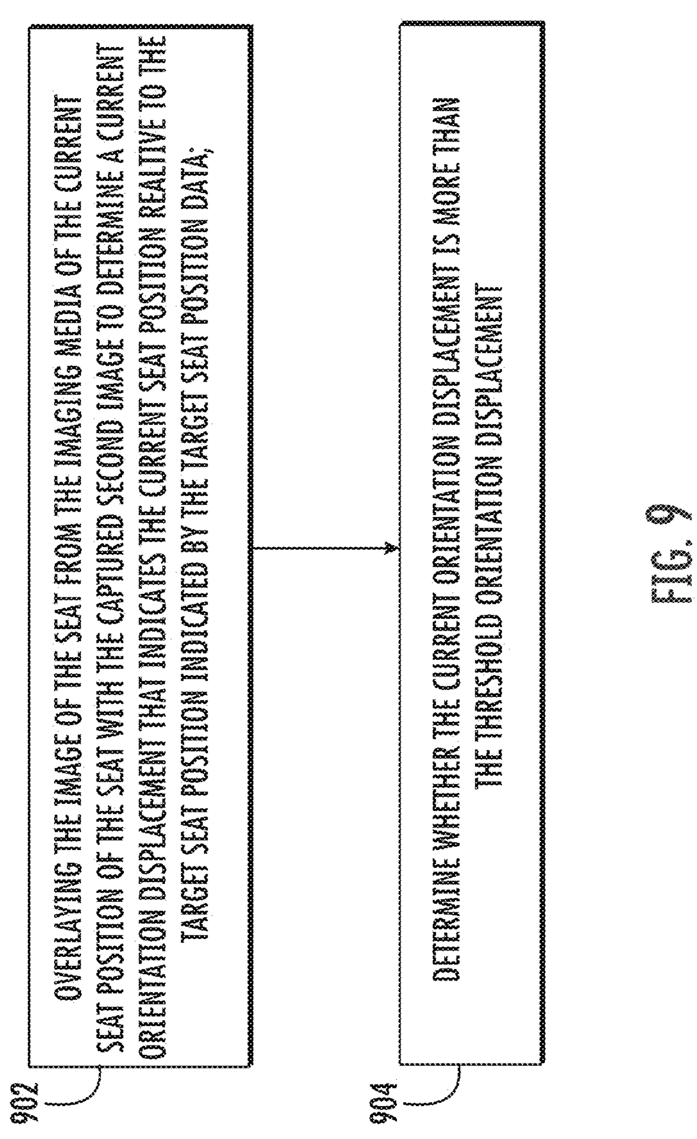
FIG. 9 is a flow chart illustrating an exemplary process of determining whether a current seat position differs from a target seat position by processing an image of the seat in the current seat position and an image of the seat in the target seat position.

FIG. 9 is a process 900 illustrating an exemplary process of determining whether a current seat position differs from a target seat position by processing an image of the seat in the current seat position and an image of the seat in the target seat position. In some examples, the process 900 is performed by the control system 102 in FIG. 1C, the control system 300 in FIG. 3, or the computer system 1100 in FIG. 11. In some examples, the image of the seat in the current seat position is one of the images 316B of the seat 132 in the current seat position of FIG. 3. In some examples, the image of the seat in the current seat position is one of the images 316A of the scat 132 in the target seat position of FIG. 3. process 900 includes blocks 902-904.

At blocks 902, the image of the seat from the imaging media of the current seat position of the seat is overlayed with the captured second image of the seat in the target seat position to determine a current orientation displacement that indicates the current seat position relative to the target seat position indicated by the target seat position data. In some examples, the differences between the imaging media of the current seat position and the imaging media of the target seat position are compared using a Structural Similarity Index (SSIM). This technique is implemented in the scikit-image library for image processing. Using the skimage.metrics-.structural similarity function from scikit-image, the function returns a score and a difference image. The score represents the structural similarity index between the two input images and can fall between the range [−1,1] with values closer to one representing higher similarity. The diff image contains the actual image differences with darker regions having more disparity. Larger areas of disparity are highlighted in black while smaller differences are in gray. From the disparity between in the difference image, the orientation differences between the current seat position and the target seat position can be calculated. Flow proceeds to process 902.

At block 904, whether the current orientation displacement is more than the threshold orientation displacement is determined. In some examples, the threshold orientation displacement is simply implicit in that it simply means that the current seat position needs to equal the target seat position, or the current seat position needs to be as close as mechanically possible given the mechanism employed by the seat actuator. In other examples, the threshold orientation displacement is defined in threshold orientation displacement data (e.g., threshold orientation displacement data 328 in FIG. 3), which defines orientation tolerances for the different dimensions of the seat position.

Figure 10:
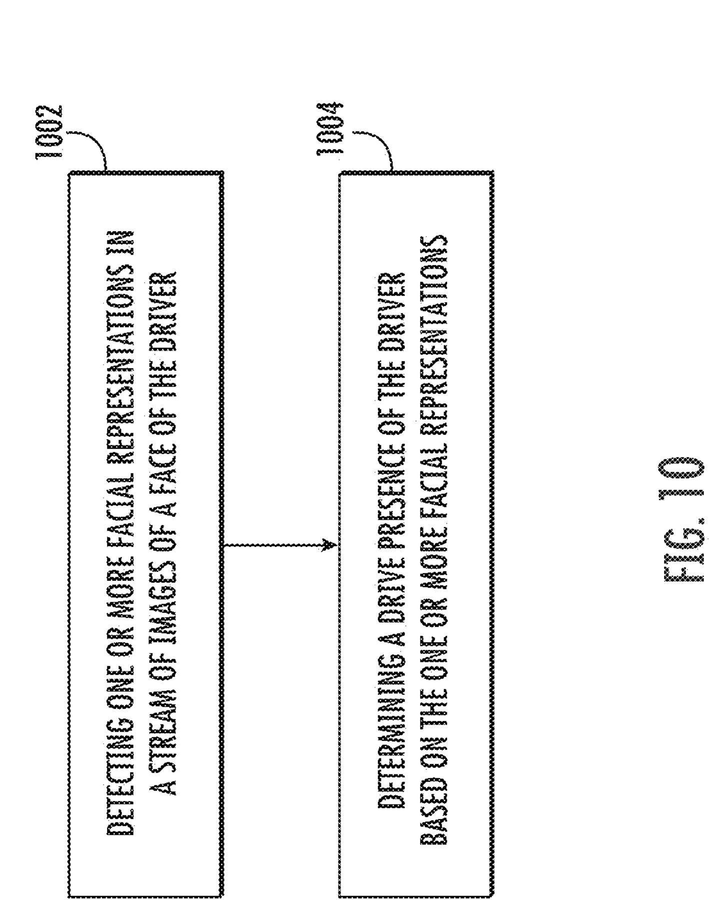
FIG. 10 is a flow chart illustrating an exemplary process for determining driver presence with a camera that is part of a driver monitoring system (DMS) in a vehicle.

FIG. 10 is a flow chart illustrating an exemplary process for determining driver presence with a camera that is part of a driver monitoring system (DMS) in a vehicle. In some examples, the process 1000 is performed by the control system 102 in FIG. 1C, the control system 300 in FIG. 3, or the computer system 1100 in FIG. 11. In some examples, the camera is the camera 101, which is also used as part of the DMS. The camera 101 is reused to perform at least some of the blocks described in FIG. 4A-FIG. 9. process 1000 includes blocks 1002-1004. Flow begins at block 1002.

At block 1002, one or more facial representations are detected in a stream of images of a face of the driver. In some examples, the stream of images are some of the images 316A in the image media 314A and/or some of the images 316B in the image media 314B. Flow proceeds to block 1004.

At block 1004, a driver's presence is determined based on the one or more representations. For example, whether the driver is drowsy, falling asleep, or in some other mental state indicating that the driver is not in condition to operate the vehicle is determined based on the facial representations.

Figure 11:
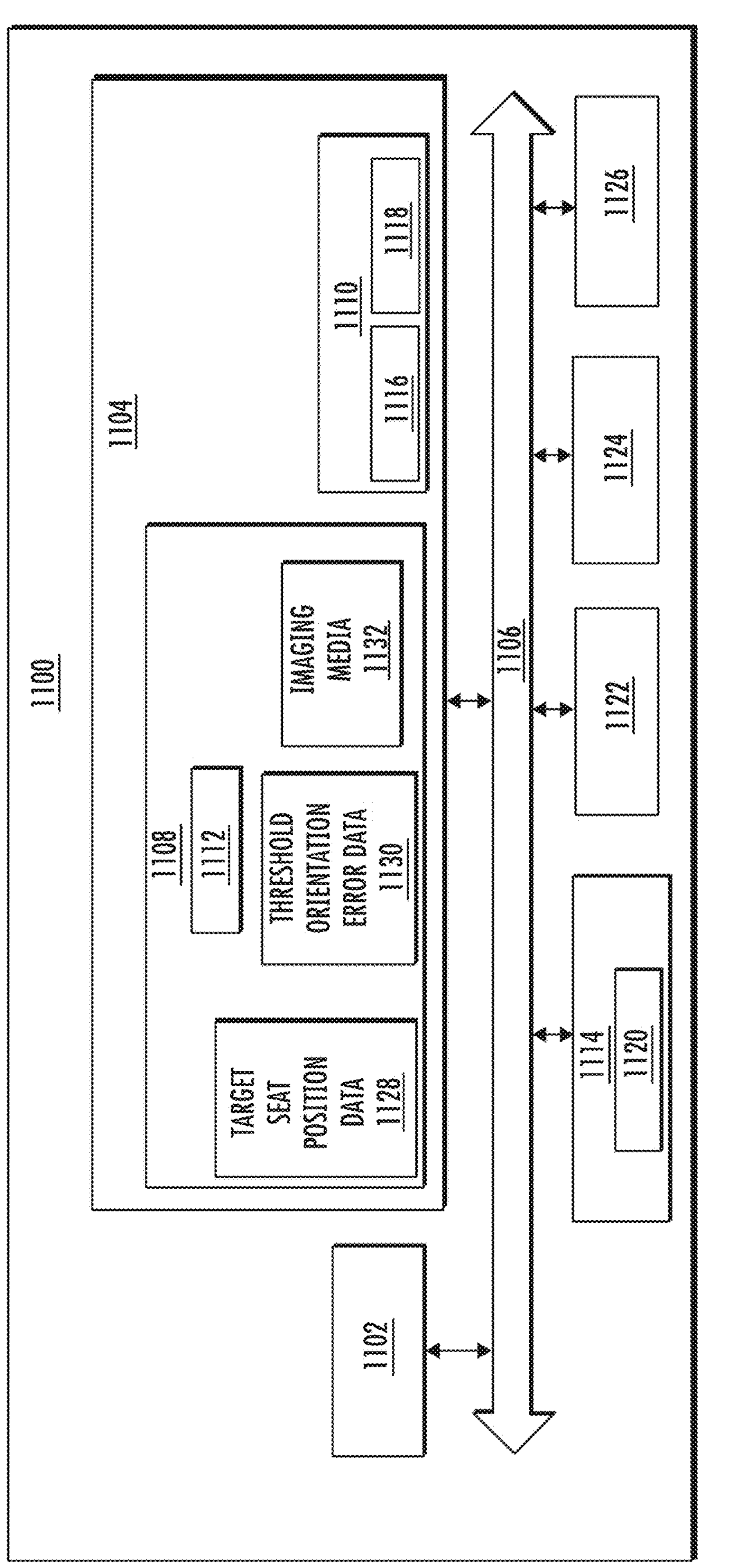
FIG. 11 is a schematic diagram of an exemplary computer system for implementing examples disclosed herein, according to an example.

FIG. 11 is a schematic diagram of an exemplary computer system 1100 for implementing examples disclosed herein, according to an example. The computer system 1100 can be used to implement the processes 400. 410, 500, 600, 700, 900, and/or 1000 in FIG. 4A, FIG. 4B, FIG. 5, FIG. 7, FIG. 9, and/or FIG. 10 respectively. More specifically, FIG. 11 is a schematic diagram of a computer system 1100 for implementing examples disclosed herein. In some examples, the control system 102 in FIG. 1C, the ECU 302 in FIG. 3, and the ECU 306 in FIG. 3 could each be provided by the computer system 1100 in FIG. 11. The computer system 1100 is adapted to execute instructions from a computer-readable medium to perform these and/or any of the functions or processing described herein. The computer system 1100 may be connected (e.g., networked) to other machines in a LAN (Local Area Network), LIN (Local Interconnect Network), automotive network communication protocol (e.g., FlexRay), an intranet, an extranet, or the Internet. While only a single device is illustrated, the computer system 1100 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, processing circuitry, etc., includes reference to one or more such devices to individually or jointly execute a set (or multiple sets) of instructions to perform any one or more of the methodologies discussed herein. For example, a control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 1100 may comprise at least one computing device or electronic device capable of including firmware, hardware, and/or executing software instructions to implement the functionality described herein. The computer system 1100 may include processing circuitry 1102 (e.g., processing circuitry including one or more processor devices or control units), a memory 1104, and a system bus 1106. The computer system 1100 may include at least one computing device having the processing circuitry 1102. The system bus 1106 provides an interface for system components including, but not limited to, the memory 1104 and the processing circuitry 1102. The processing circuitry 1102 may include any number of hardware components for conducting data or signal processing or for executing computer code stored in memory 1104. The processing circuitry 1102 may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processing circuitry 1102 may further include computer executable code that controls operation of the programmable device.

The system bus 1106 may be any of several types of bus structures that may further interconnect to a memory bus (with or without a memory controller), a peripheral bus, and/or a local bus using any of a variety of bus architectures. The memory 1104 may be one or more devices for storing data and/or computer code for completing or facilitating methods described herein. The memory 1104 may include database components, object code components, script components, or other types of information structure for supporting the various activities herein. Any distributed or local memory device may be utilized with the systems and methods of this description. The memory 1104 may be communicably connected to the processing circuitry 1102 (e.g., via a circuit or any other wired, wireless, or network connection) and may include computer code for executing one or more processes described herein. The memory 1104 may include non-volatile memory 1108 (e.g., read-only memory (ROM), erasable programmable read-only memory (EPROM), electrically erasable programmable read-only memory (EEPROM), etc.), and volatile memory 1110 (e.g., random-access memory (RAM)), or any other medium which can be used to carry or store desired program code in the form of machine-executable instructions or data structures and which can be accessed by a computer or other machine with processing circuitry 1102. A basic input/output system (BIOS) 1112 may be stored in the non-volatile memory 1108 and can include the basic routines that help to transfer information between elements within the computer system 1100.

The computer system 1100 may further include or be coupled to a non-transitory computer-readable storage medium such as the storage device 1114, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 1114 and other drives associated with computer-readable media and computer-usable media may provide non-volatile storage of data, data structures, computer-executable instructions, and the like.

Computer-code which is hard or soft coded may be provided in the form of one or more modules. The module(s) can be implemented as software and/or hard-coded in circuitry to implement the functionality described herein in whole or in part. The modules may be stored in the storage device 1114 and/or in the volatile memory 1110, which may include an operating system 1116 and/or one or more program modules 1118. All or a portion of the examples disclosed herein may be implemented as a computer program 1120 stored on a transitory or non-transitory computer-usable or computer-readable storage medium (e.g., single medium or multiple media), such as the storage device 1114, which includes complex programming instructions (e.g., complex computer-readable program code) to cause the processing circuitry 1102 to carry out actions described herein. Thus, the computer-readable program code of the computer program 1120 can comprise software instructions for implementing the functionality of the examples described herein when executed by the processing circuitry 1102. In some examples, the storage device 1114 may be a computer program product (e.g., readable storage medium) storing the computer program 1120 thereon, where at least a portion of a computer program 1120 may be loadable (e.g., into a processor) for implementing the functionality of the examples described herein when executed by the processing circuitry 1102. The processing circuitry 1102 may serve as a controller or control system for the computer system 1100 that is to implement the functionality described herein. Thus, the non-volatile memory 1108 is configured to store target seat position data 1128, threshold orientation displacement data 1130, and imaging media 1132.

The computer system 1100 may include an input device interface 1122 configured to receive input and selections to be communicated to the computer system 1100 when executing instructions, such as from a keyboard, mouse, touch-sensitive surface, etc. Such input devices may be connected to the processing circuitry 1102 through the input device interface 1122 coupled to the system bus 1106 but can be connected through other interfaces, such as a parallel port, an Institute of Electrical and Electronic Engineers (IEEE) 1394 serial port, a Universal Serial Bus (USB) port, an IR interface, and the like. The computer system 1100 may include an output device interface 1124 configured to forward output, such as to a display, a video display unit (e.g., a liquid crystal display (LCD) or a cathode ray tube (CRT)). The computer system 1100 may include a communications interface 1126 suitable for communicating with a network as appropriate or desired.

The operational actions described in any of the exemplary aspects herein are described to provide examples and discussion. The actions may be performed by hardware components, may be embodied in machine-executable instructions to cause a processor to perform the actions, or may be performed by a combination of hardware and software. Although a specific order of method actions may be shown or described, the order of the actions may differ. In addition, two or more actions may be performed concurrently or with partial concurrence.

Example 1: A computer system comprising processing circuitry configured to: (a) receive a target seat position data indicating a target seat position of a seat in a vehicle; (b) receive imaging media comprising an image of the seat from a camera indicative of a current seat position of the seat; (c) process the imaging media to determine the current seat position relative to the target seat position indicated by the target seat position data; and (d) control a seat position actuator to move the seat to a new seat position towards the target seat position, in response to the current seat position differing from the target seat position by more than a threshold orientation displacement.

Example 2: The computer system of example 1, wherein the target scat position data comprises a second image of the seat in the target seat position.

Example 3: The computer system of example 2, wherein the processing circuitry is further configured to: (e) receive second imaging media of the seat from the camera; (f) receive user input indicative that the seat is in the target seat position; (g) capture the second image in the second imaging media of the seat in the target seat position in response to receiving the user input; and (h) store the captured second image as the target seat position data in a non-transitory computer readable medium, wherein the processing circuitry is configured to (a) receive the captured second image from the non-transitory computer readable medium as the target seat position data indicating the target seat position of the seat in the vehicle.

Example 4: The computer system of example 3, wherein the processing circuitry is configured to: (c) process the imaging media by being configured to: overlaying the image of the seat from the imaging media of the current seat position of the seat with the captured second image to determine a current orientation displacement that indicates the current seat position relative to the target seat position indicated by the target seat position data; determine whether the current orientation displacement is more than the threshold orientation displacement; and (d) control the seat position actuator to move the seat to the new seat position towards the target seat position, in response to current orientation displacement being greater than the threshold orientation displacement.

Example 5: The computer system of any of examples 1-4, wherein the processing circuitry is configured to: (a) receive the target seat position data indicating a target feature position of a seat feature of the seat, wherein the target feature position indicates the target seat position of the seat in the vehicle; (c) process the imaging media by being configured to: extract a representation of the seat feature in the imaging media; and determine a current feature position data indicating a current feature position of the seat feature based on the extracted representation of the seat feature; and (d) control the seat position actuator to move the seat to the new seat position towards the target seat position, in response to the current feature position differing from the target feature position by more than the threshold orientation displacement.

Example 6: The computer system of any of examples 1-5, wherein the seat feature is a seat portion that is part of the seat and wherein the processing circuitry is configured to: (a) receive the target seat position data indicating a target seat portion position of the seat, wherein the target seat portion position indicates the target seat position of the seat in the vehicle; (c) process the imaging media by being configured to: extract a representation of the seat portion in the imaging media; and determine a current seat portion position data indicating a current seat portion position of the seat feature based on the extracted representation of the seat portion; and (d) control the seat position actuator to move the seat to the new seat position towards the target seat position, in response to the current seat portion position differing from the target seat portion position by more than the threshold orientation displacement.

Example 7: The computer system of example 6, wherein the seat portion is a headrest of the scat.

Example 8: The computer system of any of examples 1-5, wherein: the seat feature comprises a marker connected to the seat; and the processing circuitry is configured to: (a) receive the target seat position data indicating a target marker position of the marker connected to the seat, wherein the target marker position indicates the target seat position of the seat in the vehicle; (c) process the imaging media by being configured to: extract a representation of the marker in the imaging media; and determine a current marker position data indicating a current marker position of the seat feature based on the extracted representation of the marker; and (d) control the seat position actuator to move the seat to the new seat position towards the target seat position, in response to the current marker position differing from the target marker position by more than the threshold orientation displacement.

Example 9: The computer system of any of examples 1-8, wherein the processing circuitry is configured to: (a) receive the target seat position data indicating a target tilt position of a seatback of the seat; (c) process the imaging media by being configured to determine a current tilt position data indicating a current tilt position of the seat feature based on the image of the imaging media; and (d) control the seat position actuator to move the seatback of the seat to the new tilt position, in response to the current tilt position differing from the target tilt position by more than a threshold tilt displacement.

Example 10: The computer system of example 1-8, wherein the processing circuitry is configured to: (a) receive the target seat position data indicating a front/back position of the seat; (c) process the imaging media by being configured to determine a current front/back position data indicating a current front/back position of the seat feature based on the image of the imaging media; and (d) control the seat position actuator to move the seat to the new front/back position, in response to the current front/back position differing from the target front/back position by more than a threshold front/back position displacement.

Example 11: The computer system of any of examples 1-8, wherein the processing circuitry is configured to: (a) receive the target seat position data indicating a vertical position of the seat; (c) process the imaging media by being configured to determine a current vertical position data indicating a current vertical position of the seat feature based on the image of the imaging media; and (d) control the seat position actuator to move the seat to the new tilt position, in response to the current vertical position differing from the target vertical position by more than a threshold vertical position displacement.

Example 12: The computer system of any of examples 1-11, wherein the processing circuitry is configured to: (d) control the seat position actuator to move the seat to the new seat position in response to the current seat position differing from the target seat position by more than a threshold orientation displacement such that in the new seat position the new position is within the threshold orientation displacement of the target seat position.

Example 13: The computer system of any of examples 1-11, wherein the processing circuitry is configured to iteratively perform steps (b)-(d) until the current scat position does not differ from the target seat position by more than the threshold orientation displacement.

Example 14: The computer system of example 13, wherein the processing circuitry is configured to: (a) receive the target seat position data identifying a target front/back position of the seat, and a target vertical position of the seat; wherein in a first iteration of steps (b)-(d), the processing circuitry is configured to: (b) receive imaging media comprising a second image of the seat from a camera indicative of a current front/back position of the seat; (c) process the imaging media by being configured to determine a current front/back position data indicating the current front/back position of the seat based on the second image of the imaging media; and (d) control the seat position actuator to move the seat to the new front/back position, in response to the current front/back position differing from the target front/back position by more than a threshold front/back position displacement such that the new front/back position of the seat is within the threshold front/back position displacement; and wherein in a second iteration of steps (b)-(d), the processing circuitry is configured to: (b) receive imaging media comprising a third image of the seat from a camera indicative of a current vertical position of the seat; (c) process the imaging media by being configured to determine a current vertical position data indicating the current vertical position of the seat based on the image of the imaging media; and (d) control the seat position actuator to move the seat to the new vertical position, in response to the current vertical position differing from the target vertical position by more than a threshold vertical position displacement such that the new vertical position of the seat is within the threshold vertical position displacement.

Example 15: The computer system of example 14, wherein the processing circuitry is configured to perform the second iteration in response to performing the first iteration.

Example 16: The computer system of example 14, wherein the processing circuitry is configured to perform the first iteration in response to performing the second iteration.

Example 17: The computer system of example 14, wherein the processing circuitry is further configured to: (a) receive the target seat position data further indicating a target tilt of a seat back of the seat, a target front/back position of the seat, and a target vertical position of the seat; and in a third iteration of steps (b)-(d), the processing circuitry is further configured to: (b) receive imaging media comprising a first image of the seat from the camera indicative of a current tilt position of the seat; (c) process the imaging media by being configured to determine a current tilt position data indicating the current tilt position of the seat based on the first image of the imaging media; and (d) control the seat position actuator to move the seatback of the seat to the new tilt position, in response to the current tilt position differing from the target tilt position by more than a threshold tilt displacement such that the new tilt position of the seatback is within the threshold tilt displacement.

Example 18: The computer system of example 14, wherein the processing circuitry is configured to perform the first iteration in response to performing the third iteration and is configured to perform the second iteration in response to performing the first iteration.

Example 19: The computer system of example 14, wherein: the seat in the vehicle is a driver's seat; the vehicle comprises a driver monitoring system (DMS) comprising the camera; the imaging media includes a stream of images of a driver sitting in the seat of the vehicle; the processing circuitry is further configured to: detecting one or more facial representations in the stream of images of a face of the driver; determining a drive presence of the driver based on the one or more facial representations.

Example 20: A vehicle comprising the computer system of any of examples 1-19.

Example 21: The vehicle of example 20, wherein the vehicle comprises a dashboard and the camera is attached to or integrated into the dashboard.

Example 22: A computer-implemented method, comprising: (a) receiving, by processing circuitry, a target seat position data indicating a target seat position of a seat in a vehicle; (b) receiving, by the processing circuitry, imaging media comprising an image of the seat from a camera indicative of a current seat position of the seat; (c) processing, by the processing circuitry, the imaging media to determine the current seat position relative to the target seat position indicated by the target seat position data; and (d) controlling, by the processing circuitry, a seat position actuator to move the seat to a new seat position towards the target seat position, in response to the current seat position differing from the target seat position by more than a threshold orientation displacement.

Example 23: A non-transitory computer-readable storage medium comprising instructions, which when executed by the processing circuitry, cause the processing circuitry to perform the method of example The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A computer system comprising processing circuitry configured to:

(a) receive first imaging media of a seat in a vehicle from a camera;

(b) receive user input indicative that the seat is in the target seat position;

(c) capture the first image in the first imaging media of the seat in the target seat position in response to receiving the user input;

(d) store the captured first image as target seat position data in a non-transitory computer readable medium;

(e) receive a target seat position data indicating the target seat position of the seat in the vehicle, the target seat position data comprising the first image of the seat in the target seat position;

(f) receive second imaging media comprising a second image of the seat from the camera indicative of a current seat position of the seat;

(g) process the second imaging media to determine the current seat position of the second imaging media relative to the target seat position of the first imaging media as indicated by the target seat position data; and (h) control a seat position actuator to move the seat from the current seat position of the second imaging media to a new seat position towards the target seat position of the first imaging media, in response to the current seat position differing from the target seat position by more than a threshold orientation displacement.

2. The computer system of claim 1, wherein the processing circuitry is configured to:

(g) process the second imaging media by being configured to:

overlay the second image of the seat from the second imaging media of the current seat position of the seat with the captured first image to determine a current orientation displacement that indicates the current seat position relative to the target seat position indicated by the target seat position data; and determine whether the current orientation displacement is more than the threshold orientation displacement; and (h) control the seat position actuator to move the seat to the new seat position towards the target seat position, in response to current orientation displacement being greater than the threshold orientation displacement.

3. The computer system of claim 1, wherein the processing circuitry is configured to:

(e) receive the target seat position data indicating the target feature position of the seat feature of the seat, wherein the target feature position indicates the target seat position of the seat in the vehicle;

(g) process the second imaging media by being configured to:

extract a representation of the seat feature in the second imaging media; and determine a current feature position data indicating a current feature position of the seat feature based on the extracted representation of the seat feature; and (h) control the seat position actuator to move the seat to the new seat position towards the target seat position, in response to the current feature position differing from the target feature position by more than the threshold orientation displacement.

4. The computer system of claim 3, wherein:

the seat feature comprises a marker connected to the seat; and the processing circuitry is configured to:

(e) receive the target seat position data indicating a target marker position of the marker connected to the seat, wherein the target marker position indicates the target seat position of the seat in the vehicle;

(g) process the second imaging media by being configured to:

extract a representation of the marker in the second imaging media; and determine a current marker position data indicating a current marker position of the seat feature based on the extracted representation of the marker; and (h) control the seat position actuator to move the seat to the new seat position towards the target seat position, in response to the current marker position differing from the target marker position by more than the threshold orientation displacement.

5. The computer system of claim 1, wherein the seat feature is a seat portion that is part of the seat and wherein the processing circuitry is configured to:

(e) receive the target seat position data indicating the target seat portion position of the seat, wherein the target seat portion position indicates the target seat position of the seat in the vehicle;

(g) process the second imaging media by being configured to:

extract a representation of the seat portion in the second imaging media; and determine a current seat portion position data indicating a current seat portion position of the seat feature based on the extracted representation of the seat portion; and (h) control the seat position actuator to move the seat to the new seat position towards the target seat position, in response to the current seat portion position differing from the target seat portion position by more than the threshold orientation displacement.

6. The computer system of claim 1, wherein the processing circuitry is configured to:

(e) receive the target seat position data indicating a target tilt position of a seatback of the seat;

(g) process the second imaging media by being configured to determine a current tilt position data indicating a current tilt position of the seat feature based on the second image of the second imaging media; and (h) control the seat position actuator to move the seatback of the seat to the new tilt position, in response to the current tilt position differing from the target tilt position by more than a threshold tilt displacement.

7. The computer system of claim 1, wherein the processing circuitry is configured to:

(e) receive the target seat position data indicating a front/back position of the seat;

(g) process the second imaging media by being configured to determine a current front/back position data indicating a current front/back position of the seat feature based on the second image of the second imaging media; and (h) control the seat position actuator to move the seat to the new front/back position, in response to the current front/back position differing from the target front/back position by more than a threshold front/back position displacement.

8. The computer system of claim 1, wherein the processing circuitry is configured to:

(e) receive the target seat position data indicating a vertical position of the seat;

(g) process the second imaging media by being configured to determine a current vertical position data indicating a current vertical position of the seat feature based on the second image of the second imaging media; and (h) control the seat position actuator to move the seat to the new tilt position, in response to the current vertical position differing from the target vertical position by more than a threshold vertical position displacement.

9. The computer system of claim 1, wherein the processing circuitry is configured to:

(h) control the seat position actuator to move the seat to the new seat position in response to the current seat position differing from the target seat position by more than a threshold orientation displacement such that in the new seat position the new position is within the threshold orientation displacement of the target seat position.

10. The computer system of claim 1, wherein the processing circuitry is configured to iteratively perform steps (f)-(h) until the current seat position does not differ from the target seat position by more than the threshold orientation displacement.

11. The computer system of claim 10, wherein the processing circuitry is configured to:

(e) receive the target seat position data identifying a target front/back position of the seat, a target vertical position of the seat, and a target tilt of a seat back of the seat;

wherein in a first iteration of steps (f)-(h), the processing circuitry is configured to:

(f) receive the second imaging media comprising the second image of the seat from the camera indicative of a current front/back position of the seat;

(g) process the second imaging media by being configured to determine a current front/back position data indicating the current front/back position of the seat based on the first image of the second imaging media; and (h) control the seat position actuator to move the seat to the new front/back position, in response to the current front/back position differing from the target front/back position by more than a threshold front/back position displacement such that the new front/back position of the seat is within the threshold front/back position displacement; and wherein in a second iteration of steps (f)-(h), the processing circuitry is configured to:

(f) receive the second imaging media comprising a third image of the seat from a camera indicative of a current vertical position of the seat;

(g) process the second imaging media by being configured to determine a current vertical position data indicating the current vertical position of the seat based on the second image of the second imaging media; and (h) control the seat position actuator to move the seat to the new vertical position, in response to the current vertical position differing from the target vertical position by more than a threshold vertical position displacement such that the new vertical position of the seat is within the threshold vertical position displacement.

12. The computer system of claim 11, wherein the processing circuitry is configured to perform the second iteration in response to performing the first iteration.

13. The computer system of claim 11, wherein the processing circuitry is configured to perform the first iteration in response to performing the second iteration.

14. The computer system of claim 11, wherein the processing circuitry is further configured to:

(e) receive the target seat position data further indicating a target tilt of a seat back of the seat, a target front/back position of the seat, and a target vertical position of the seat; and in a third iteration of steps (b)-(d), the processing circuitry is further configured to:

(f) receive the second imaging media comprising a fourth image of the seat from the camera indicative of a current tilt position of the seat;

(g) process the second imaging media by being configured to determine a current tilt position data indicating the current tilt position of the seat based on the fourth image of the second imaging media; and (h) control the seat position actuator to move the seatback of the seat to the new tilt position, in response to the current tilt position differing from the target tilt position by more than a threshold tilt displacement such that the new tilt position of the seatback is within the threshold tilt displacement.

15. The computer system of claim 14, wherein the processing circuitry is configured to perform the first iteration in response to performing the third iteration and is configured to perform the second iteration in response to performing the first iteration.

16. The computer system of claim 14, wherein:

the seat in the vehicle is a driver's seat;

the vehicle comprises a driver monitoring system (DMS) comprising the camera;

the second imaging media includes a stream of images of a driver sitting in the seat of the vehicle;

the processing circuitry is further configured to:

detecting one or more facial representations in the stream of images of a face of the driver;

determining a drive presence of the driver based on the one or more facial representations.

17. A vehicle comprising a computer system, wherein the computer system comprises processing circuitry configured to:

(a) receive first imaging media of a seat in a vehicle from a camera;

(b) receive user input indicative that the seat is in the target seat position;

(c) capture the first image in the first imaging media of the seat in the target seat position in response to receiving the user input;

(d) store the captured first image as target seat position data in a non-transitory computer readable medium;

(e) receive a target seat position data indicating the target seat position of the seat in the vehicle, the target seat position data comprising the first image of the seat in the target seat position;

(f) receive second imaging media comprising a second image of the seat from the camera indicative of a current seat position of the seat;

(g) process the second imaging media to determine the current seat position of the second imaging media relative to the target seat position of the first imaging media as indicated by the target seat position data; and (h) control a seat position actuator to move the seat from the current seat position of the second imaging media to a new seat position towards the target seat position of the first imaging media, in response to the current seat position differing from the target seat position by more than a threshold orientation displacement.

18. The vehicle of claim 17, wherein the vehicle comprises a dashboard and the camera is attached to or integrated into the dashboard.

19. A computer-implemented method, comprising:

(a) receiving, by processing circuitry, first imaging media of a seat in a vehicle from a camera;

(b) receiving, by processing circuitry, user input indicative that the seat is in the target seat position;

(c) capturing, by the processing circuitry, the first image in the first imaging media of the seat in the target seat position in response to receiving the user input;

(d) storing, by the processing circuitry, the captured first image as target seat position data in a non-transitory computer readable medium;

(e) receiving, by the processing circuity, a target seat position data indicating the target seat position of the seat in the vehicle, the target seat position data comprising the first image of the seat in the target seat position;

(f) receiving, by the processing circuity, second imaging media comprising a second image of the seat from the camera indicative of a current seat position of the seat;

(g) processing, by the processing circuity, the second imaging media to determine the current seat position of the second imaging media relative to the target seat position of the first imaging media as indicated by the target seat position data; and (h) controlling, by the processing circuitry, a seat position actuator to move the seat from the current seat position of the second imaging media to a new seat position towards the target seat position of the first imaging media, in response to the current seat position differing from the target seat position by more than a threshold orientation displacement.

20. A non-transitory computer-readable storage medium comprising instructions, which when executed by processing circuitry, cause the processing circuitry to perform a method comprising:

(a) receiving, by processing circuitry, first imaging media of a seat in a vehicle from a camera;

(b) receiving, by processing circuitry, user input indicative that the seat is in the target seat position;

(c) capturing, by the processing circuitry, the first image in the first imaging media of the seat in the target seat position in response to receiving the user input;

(d) storing, by the processing circuitry, the captured first image as target seat position data in the non-transitory computer readable medium or in a different non-transitory computer readable medium;

(e) receiving, by the processing circuity, a target seat position data indicating the target seat position of the seat in the vehicle, the target seat position data comprising the first image of the seat in the target seat position;

(f) receiving, by the processing circuity, second imaging media comprising a second image of the seat from the camera indicative of a current seat position of the seat;

(g) processing, by the processing circuity, the second imaging media to determine the current seat position of the second imaging media relative to the target seat position of the first imaging media as indicated by the target seat position data; and (h) controlling, by the processing circuitry, a seat position actuator to move the seat from the current seat position of the second imaging media to a new seat position towards the target seat position of the first imaging media, in response to the current seat position differing from the target seat position by more than a threshold orientation displacement.

* * * * *